(12) United States Patent
Soatto et al.

(10) Patent No.: US 9,418,317 B2
(45) Date of Patent: *Aug. 16, 2016

(54) END-TO END VISUAL RECOGNITION SYSTEM AND METHODS

(71) Applicant: THE REGENTS OF THE UNIVERSITY OF CALIFORNIA, Oakland, CA (US)

(72) Inventors: Stefano Soatto, Pasadena, CA (US); Taehee Lee, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/245,159

(22) Filed: Apr. 4, 2014

(65) Prior Publication Data

US 2014/0301635 A1    Oct. 9, 2014

Related U.S. Application Data

(63) Continuation of application No. 13/735,703, filed on Jan. 7, 2013, now Pat. No. 8,717,437, which is a continuation of application No. PCT/US2011/043439, filed on Jul. 8, 2011.

(60) Provisional application No. 61/362,528, filed on Jul. 8, 2010.

(51) Int. Cl.
    *G06K 9/62*      (2006.01)
    *G06K 9/00*      (2006.01)
    (Continued)

(52) U.S. Cl.
    CPC ............ *G06K 9/626* (2013.01); *G06K 9/00671* (2013.01); *G06K 9/00744* (2013.01); *G06K 9/4671* (2013.01); *G06K 9/6255* (2013.01); *G06T 7/2033* (2013.01); *G06T 7/2073* (2013.01)

(58) Field of Classification Search
    None
    See application file for complete search history.

(56) References Cited

U.S. PATENT DOCUMENTS 4,953,554 A    9/1990  Zerhouni et al.
5,054,489 A   10/1991  Axel et al.
(Continued)

FOREIGN PATENT DOCUMENTS

WO    2012/006578 A2    1/2012

OTHER PUBLICATIONS

Fulkerson, Brian. "Finding Categories". Doctoral Thesis. Research Theses and Dissertations, California Sea Grant College Program, UC San Diego Jun. 1, 2010. See website: http://escholarship.org/uc/item/9x72c5g9.*

(Continued)

*Primary Examiner* — Dave Czekaj
*Assistant Examiner* — Tyler W Sullivan
(74) *Attorney, Agent, or Firm* — O'Banion & Ritchey LLP; John P. O'Banion

(57) ABSTRACT

We describe an end-to-end visual recognition system, where "end-to-end" refers to the ability of the system of performing all aspects of the system, from the construction of "maps" of scenes, or "models" of objects from training data, to the determination of the class, identity, location and other inferred parameters from test data. Our visual recognition system is capable of operating on a mobile hand-held device, such as a mobile phone, tablet or other portable device equipped with sensing and computing power. Our system employs a video based feature descriptor, and we characterize its invariance and discriminative properties. Feature selection and tracking are performed in real-time, and used to train a template-based classifier during a capture phase prompted by the user. During normal operation, the system scores objects in the field of view based on their ranking.

13 Claims, 17 Drawing Sheets

(51) Int. Cl.
  *G06K 9/46* (2006.01)
  *G06T 7/20* (2006.01)

(56) References Cited

U.S. PATENT DOCUMENTS

| | | | |
|---|---|---|---|
| 5,111,820 A | 5/1992 | Axel et al. | |
| 5,217,016 A | 6/1993 | Axel et al. | |
| 6,453,187 B1 | 9/2002 | Prince et al. | |
| 6,564,263 B1* | 5/2003 | Bergman | G06F 17/30244 707/999.003 |
| 6,834,080 B1* | 12/2004 | Furukawa | H04N 19/139 348/699 |
| 6,892,089 B1 | 5/2005 | Prince et al. | |
| 7,773,813 B2* | 8/2010 | Hua | G06F 17/30811 348/231.2 |
| 8,891,020 B2* | 11/2014 | Kapoor | H04N 5/147 348/701 |
| 2008/0009704 A1 | 1/2008 | Gharib et al. | |
| 2008/0269595 A1 | 10/2008 | Wong | |
| 2009/0022472 A1* | 1/2009 | Bronstein | G06K 9/00751 386/278 |
| 2009/0216693 A1* | 8/2009 | Rujan | G06F 17/3071 706/12 |
| 2010/0014735 A1 | 1/2010 | Bi et al. | |
| 2010/0063380 A1 | 3/2010 | Duerk et al. | |

OTHER PUBLICATIONS

Korean Intellectual Property Office, International Search Report and Written Opinion (pp. 1-8) issued on Jul. 23, 2012 for corresponding International Patent Application No. PCT/US2012/023726 with claims searched (pp. 9-23) pp. 1-23.

Axel, L., "MR Imaging of Motion with Spatial Modulation of Magnetization," Radiology, Jun. 1989, vol. 171, pp. 841-845.
Bolster, B.D. Jr., et al., "Myocardial Tagging in Polar Coordinates with Use of Striped Tags," Radiology, Dec. 1990, vol. 177, pp. 769-772.
Pauly, J., et al., "A Linear Class of Large-Tip-Angle Selective Excitation Pulses," Journal of Magnetic Resonance, May 1989, vol. 82, pp. 571-587.
Spiegel, M.A., et al., "Ring Tag: Ring-Shaped Tagging for Myocardial Centerline Assessment," Investigative Radiology, Oct. 2003, vol. 38, No. 10, pp. 669-678.
Tsekos, N.V., et al., "Myocardial Tagging with B1 Insensitive Adiabatic DANTE Inversion Sequences," Magnetic Resonance in Medicine, Sep. 1995, vol. 33, No. 3, pp. 395-401.
Zerhouni, E.A., et al., "Human Heart: Tagging with MR Imaging—A Method for Noninvasive Assessment of Myocardial Motion," Cardiac Radiology, Oct. 1988, vol. 169, pp. 5-63.
Bay, H., et al., "SURF: Speeded Up Robust Features," Lecture Notes in Computer Science, vol. 3951, 2006, pp. 404-417.
Chandrasekhar, V., et al., "CHoG: Compressed Histogram of Gradients," IEEE Conference on Computer Vision and Pattern Recognition, Jun. 20-25, 2009, pp. 2504-2511.
Wikipedia, "GLOH," http://en.wikipedia.org/wiki/GLOH, retrieved on Jun. 15, 2011, page updated on Feb. 19, 2009, pp. 1-2.
Lepetit, V. and Fua, P., "Keypoint Recognition using Randomized Trees," IEEE Transactions on Pattern Analysis and Machine Intelligence, Sep. 2006, vol. 28, Issue 9, pp. 1465-1479.
Lowe, D.G., "Distinctive Image Features from Scale-Invariant Keypoints," International Journal of Computer Vision, Nov. 2004, vol. 60, Issue 2, pp. 91-110.
Mikolajczyk, K. and Schmid, C., "A performance evaluation of local descriptors," IEEE Transactions on Pattern Analysis and Machine Intelligence, Oct. 2005, vol. 27, Issue 10, pp. 1615-1630.

* cited by examiner

TST: tracking features on the selection tree

CONSTRUCT image pyramid
LOOP scale FROM max_scale TO min_scale
    SELECT features AT current scale
    FOR EACH feature AT current scale
        IF EXIST parent AT some scale FROM scale+1 TO max_scale
            PROPAGATE parent's motion TO feature
        ENDIF
        TRACK feature AT current scale
        VERIFY feature track quality
    ENDFOR
ENDLOOP

FIG. 1

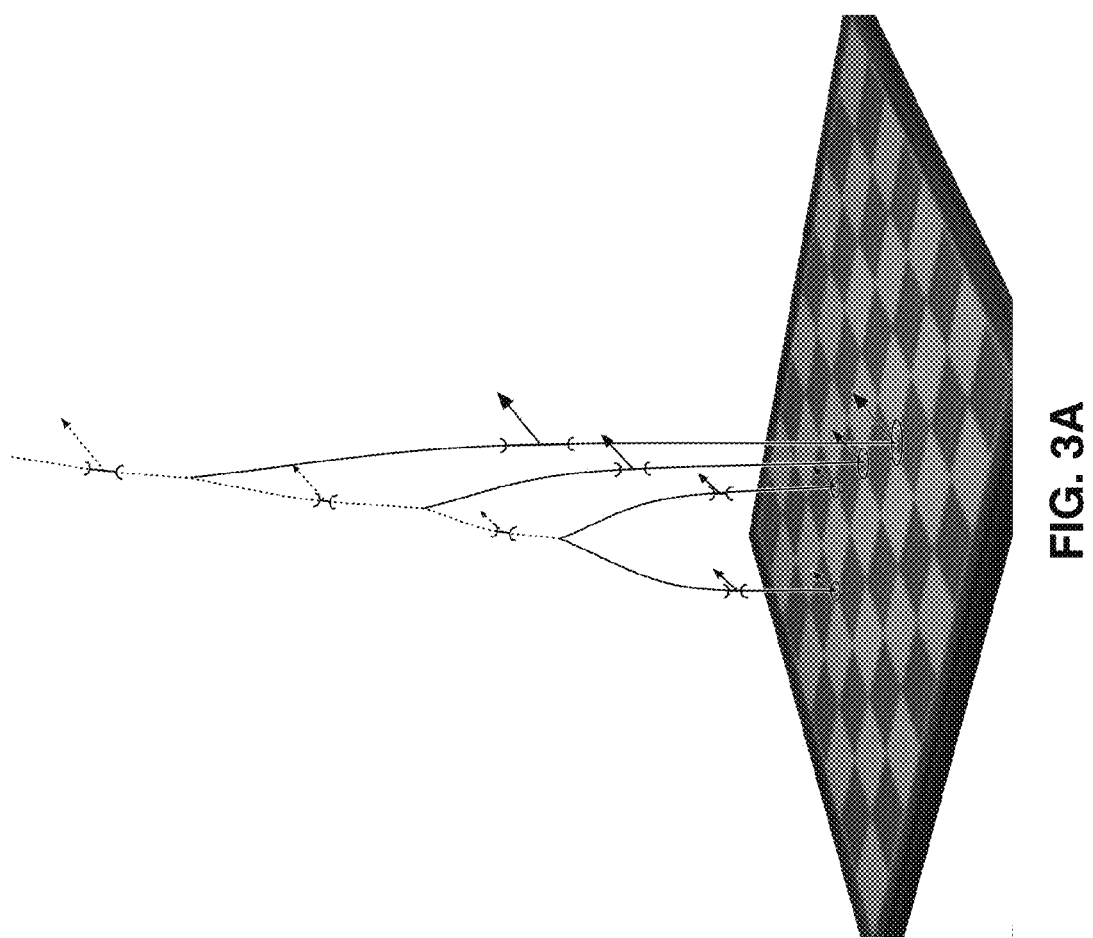

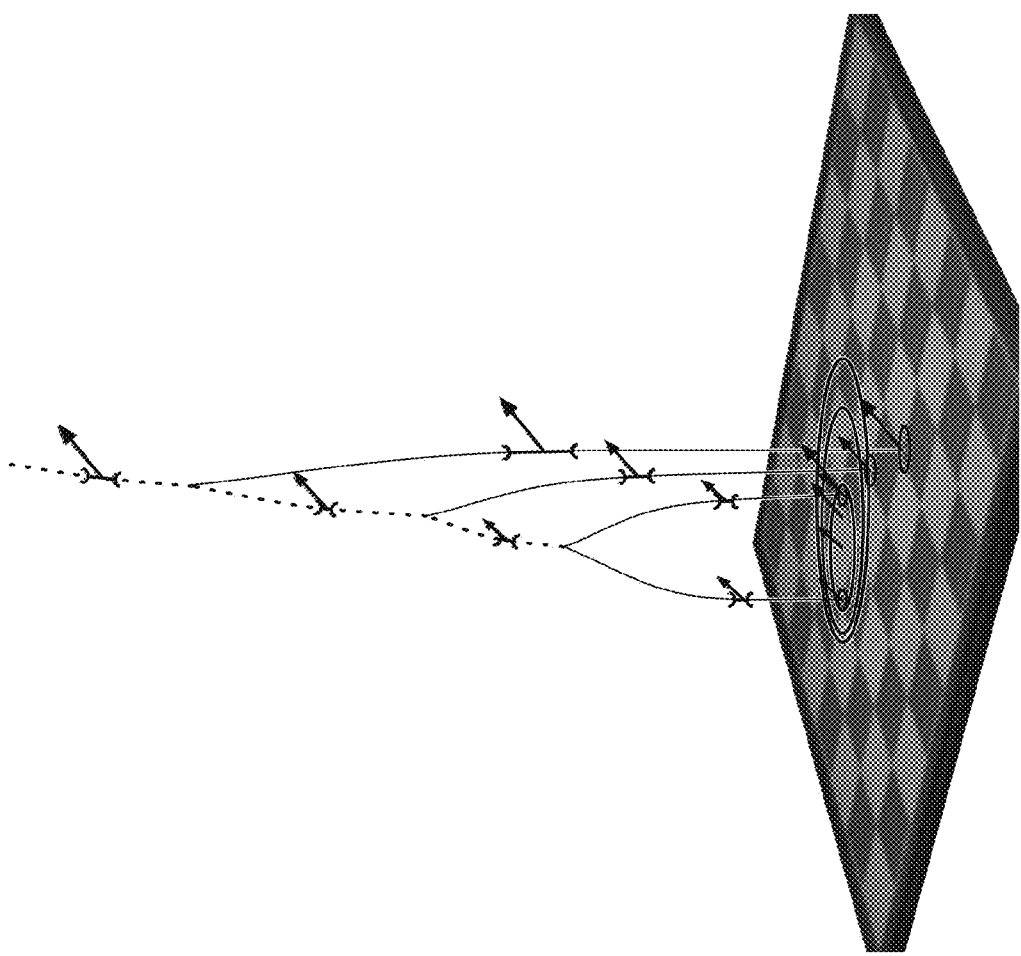

END-TO END VISUAL RECOGNITION SYSTEM AND METHODS

CROSS-REFERENCE TO RELATED APPLICATIONS

This application is a continuation of U.S. patent application Ser. No. 13/735,703 filed on Jan. 7, 2013, incorporated herein by reference in its entirety, which is a 35 U.S.C. §111 (a) continuation of PCT international application number PCT/US2011/043439 filed on Jul. 8, 2011, incorporated herein by reference in its entirety, which claims the benefit of U.S. provisional patent application Ser. No. 61/362,528 filed on Jul. 8, 2010, incorporated herein by reference in its entirety. Priority is claimed to each of the foregoing applications.

The above-referenced PCT international application was published as PCT International Publication No. WO 2012/006578 on Jan. 12, 2012 and republished on Mar. 29, 2012, and is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to visual recognition, namely a collection of inference tasks performed by exploiting imaging data.

2. Description of Related Art

Currently the majority of new mobile phones are configured with a camera, which allows users to capture, process, record and transmit still images and video. In addition to the traditional use of a camera, integration with several sensors in mobile phones provides location-based services by retrieving specialized information for the location and orientation input from the Global Positioning System (GPS) and/or gyrometers and/or accelerometers. Some applications overlay this information on top of live video frames from the camera in the display, letting users have augmented reality experiences. Displays may include built-in screens, monitors, or other display, including remote displays such as goggle-mounted or other wearable display.

Although these location-based services have greatly increased public usability of mobile platforms, they lack the ability for utilizing the vision capability of such devices and there is no understanding of or relation to the actual scene and objects that the user is targeting with the device. This not only reduces the quality of visually proper registration of the information, but also limits the capability of interaction between the user and the scene objects using the information.

One primary difficulty with recognizing objects and scenes from images is the large nuisance variability that the data can exhibit, depending on the vantage point (position and orientation of the object or scene relative to the sensor), visibility conditions (occlusions), illumination, and other variations under which the object is seen, even if it does not exhibit intrinsic variability. In addition, intra-class variability can add to the complexity of the task. It is known that nuisance variability comprises almost the entirety of the variability in the data, as what remains after viewpoint and contrast variability is factored out and is supported on a zero-measure subset of the image domain. The most common approach to deal with nuisance variability is to eliminate it or reduce its effects by pre-processing the data to obtain "insensitive" and yet "distinctive" features, and to "learn away" the residual nuisance variability using generic tools from Machine Learning, often using a training set of manually labeled images. Both practices are poorly grounded in principle for several reasons such as: (1) pre-processing does not generally improve classification performance, as established by the Data Processing Inequality; and (2) training a classifier using collections of isolated snapshots (single images) of physically different scenes or objects brings into question the fact that there is a scene from which images are generated, and limits the classifier to learning generic regularities in images rather than specific and distinguishing features of the scene or objects. This is because the complexity of the scene is infinitely larger than the complexity of the images. Indeed, it can be shown that, when a visual recognition system is built and trained using a collection of passively gathered independent snapshots, not only is the worst-case error that can be guaranteed at chance level (i.e., the expected probability of error, a.k.a. risk, is the same that is given by the prior probability), but so is the average case. This is not the case, however, when the training data consists of multiple purposefully captured images of the same scene during an active exploration phase.

BRIEF SUMMARY OF THE INVENTION

The present invention generally comprises novel visual recognition methods and apparatuses. Visual recognition is a collection of inference tasks performed by exploiting imaging data. Imaging data include optical images and video, as well as data obtained through other modalities including infra-red, multi-spectral, laser, radar, and any other remote sensing device. The inference tasks include classification tasks such as detection (is an object there in the scene?), classification and categorization (does an object belong to a certain class, or category?), recognition or identification (is this a particular object or scene?), as well as regression tasks such as localization (where is the object in the scene or in the image?). "Object" here indicates a portion of a scene, or the entirety of the scene. For this reason, "object" and "scene" can be used interchangeably in the discussion that follows. For "scenes", that can be considered geo-located objects, the gravity vector is a suitable canonization mechanism. However, for "detached objects" that can be placed in various positions and orientation, resting on different surfaces, other rotation canonization mechanism has to be used, for example the maximum gradient direction. Example visual recognition tasks include the detection, localization and recognition of a previously-seen object within a novel scene, or the determination of the location of the camera, relative to a previously learned "map", given one or more images taken from said camera.

One aspect of the invention pertains to an end-to-end visual recognition system, where "end-to-end" refers to the ability of the system of performing all aspects of the system, from the construction of "maps" of scenes, or "models" of objects from training data, to the determination of the class, identity, location and other inferred parameters from test data.

Another aspect of the invention pertains to an end-to-end visual recognition system capable of operating on a mobile hand-held device, such as a mobile phone, tablet or other portable device equipped with sensing and computing power.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is pseudocode for tracking features on a selection tree according to an embodiment of the present invention.

FIG. 3A through FIG. 3D are 3D plots of Tracking on a Selection Tree (TST) according to an embodiment of the present invention.

DETAILED DESCRIPTION OF THE INVENTION

1. Introduction

Figure 2:
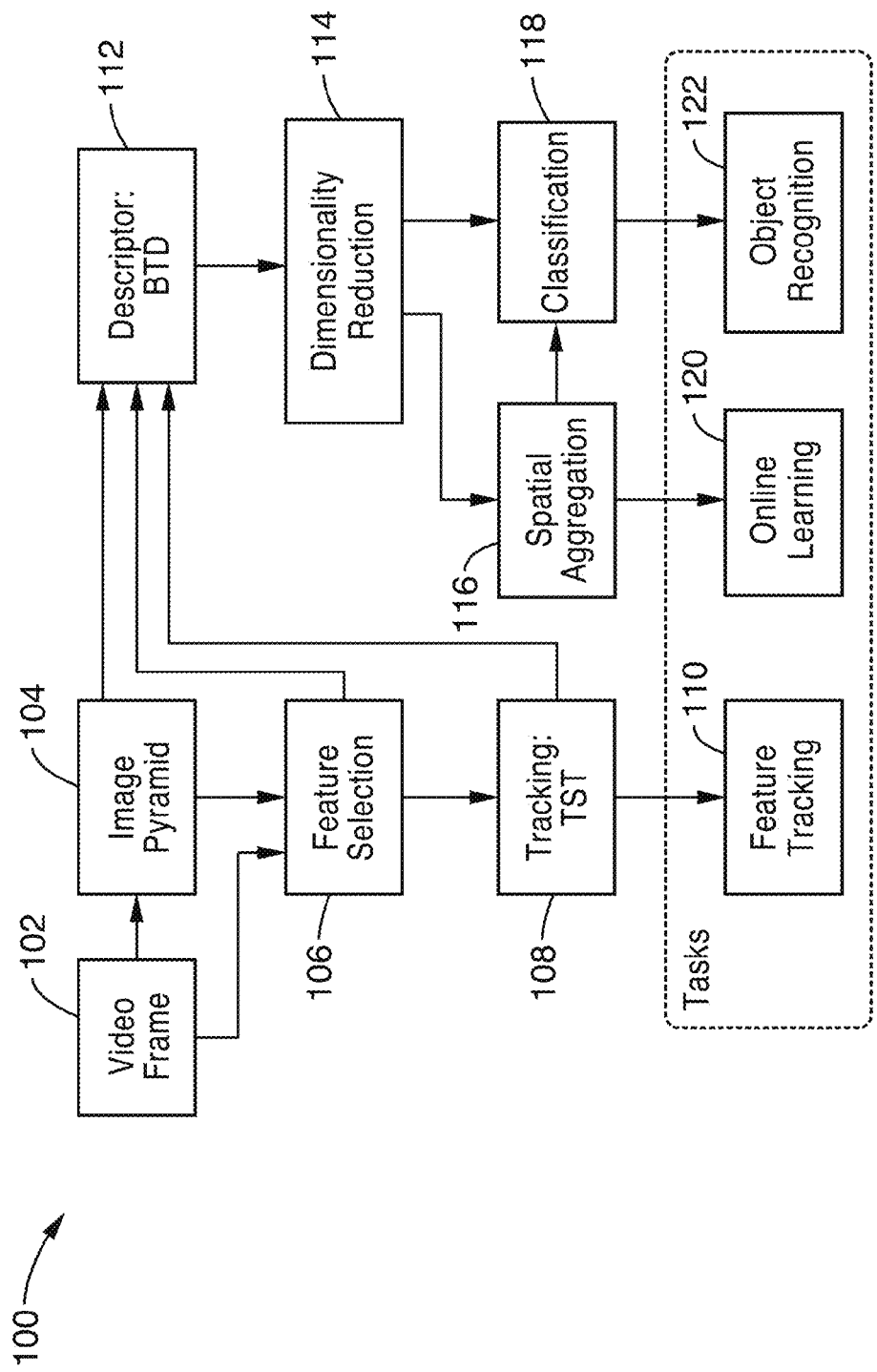
FIG. 2 is a block diagram of an end-to-end visual recognition system workflow according to an embodiment of the present invention.

By way of example, and not of limitation, the present invention advances a different approach to recognition, whereby the training set consists not of isolated snapshots, such as photo collections harvested from the web, but comprises temporally coherent sequences of images where the user is free to move around an object or manipulate it. Using our inventive "Best Template Descriptor" (BTD) approach, the inventive system makes use of such a temporal consistency in order to construct a "representation" of the object that is maximally insensitive to viewpoint and contrast variation, and maximally discriminative. As used herein, there term "representation" is the output of a series of computations performed using sensed data (and therefore is a deterministic function of the data, hence a statistic, or "feature"); it comprises local components, often called "descriptors", or "feature descriptors" computed using portions of the data, where often, but not necessarily, such portions of the data are also inferred from the data via additional operators, often called "detectors" or "feature detectors". A descriptor can be generated with or without a detector. Note that the term "feature" can indicate a feature detector, a feature descriptor, or a representation.

Even if the objects are static, it can be shown that the presence of multiple images of the same physical scene in the training set, for example as available in a video sequence, results in quantifiably superior recognition performance when recognition is performed in a single (test) image. It should be noted, therefore, that an aspect of our invention is that there be multiple images of the same scene, taken from different vantage point, where correspondence is established between co-variant regions in the different images. Video makes this easy, in the sense that Tracking on a Selection Tree (TST) or other multi-scale tracking algorithms enable easily establishing such a correspondence. However, if such a correspondence was given by external means, we could still construct our inventive Best Template Descriptor (BTD). Accordingly, our invention is not restricted to video, but is also applicable to collection of multiple images of the same scene, where low-level feature region correspondence has been established, or can be established.

Furthermore, the issue of representation is well grounded in the presence of multiple images of the same scene, as it enables removing object-specific nuisance variability, rather than removing generic nuisance variability that results in a loss of discriminative power. Also, in terms of practicality, temporal continuity as available in a video sequence provides the crucial "bit" that a block of images in the training set are of the same scene, and therefore all the variability in the data can be ascribed to the nuisances. This enables more efficient training, where no human annotation is necessary to establish correspondence between different training samples from the same class.

Contrary to common perception, building representations of objects from video for the purpose of recognition is not only a more sound process than extracting statistics from single isolated snapshots, but it is also more computationally efficient, despite the involvement of more data. In fact, the descriptor taught herein is far more efficient to compute than common descriptors computed from single images, and improves both discriminative properties (specificity) and invariance (robustness, or insensitivity to nuisance factors).

To demonstrate this improvement, the representation here is derived from first principles, which requires that the descriptor be the "best" among those that are tailored to a chosen family of classifiers, and empirically compute the performance of the resulting recognition scheme, comparing it with popular baseline algorithms. What is "best" depends on the set of classifiers; we illustrate a preferred embodiment relative to the class of nearest-neighbor based classifiers, but the construction methodology is general, and can be performed for any derivative classifier that employs mutual distances, such as Support Vector Machines and their various Kerne Versions, Neural Networks, and Boosting classifiers including Random Forest. In the case of the preferred embodiment, the classifier can be derived on closed-form.

2. Representation

This section describes the mathematical model underlying the methodology to design optimal descriptors, of which the "Best Template Descriptor" (BTD) is a preferred embodiment.

2.1 Assumptions and Conventions

A grayscale image $I:\Omega \subset \mathbb{R}^2 \to \mathbb{R}_+; x \mapsto I(x)$ is the simplest example of "imaging data" we consider; it maps a compact subset of the real plane (e.g. the surface of the electro-optical sensor) onto the positive reals, often quantized into a number of gray levels. Extensions include color images, infra-red images, multi-spectral images, and active-sensing modalities including time-of-flight, lidar, radar, active illumination, etc. An image is generated by a scene $\xi=\{S,\rho\} \in \Xi$ made of piece-wise smooth (multiply-connected) surfaces $S \subset \mathbb{R}^3$ and a diffuse albedo function $\rho:S \to \mathbb{R}$ that maps each point on the surface onto a gray-scale value. The data depends on nuisance factors, that are phenomena that are not of interest, and yet affect the data. In traditional communications and signal processing these are often called "noise" although in visual recognition such nuisances include viewpoint, illumination, occlusions and other phenomena that cannot be ascribed to a statistically simple model (e.g. linear, additive, stationary, ergodic, etc.). Nuisances $\{g,v\}$ are divided into those that are a group $g \in G$ (e.g., contrast transformations, local changes of viewpoint away from occluding boundaries) and a non-invertible map v (e.g., quantization, occlusions, cast shadows, etc.). Deviations from this model (e.g., non-diffuse reflectance, mutual illumination, cast shadows, sensor noise) are not represented explicitly and lumped as an additive error n. As a result, the data formation model has that an image is a function of the scene and the nuisances, divided into the invertible, the non-invertible, and the additive ones, via $$I=h(g\xi,v)+n. \quad (1)$$

It should be noticed that this is the simplest instantiation of the problem, and is made here for the purpose of explanation and not limitation. More general models where non-Lambertian reflection and illumination are explicitly taken into account can be derived. Also, more general models where the scene is not static, but allowed to change over time in response to unknown input, can be used without changing the general methodology derived below. A general visual recognition task consists of a regression or classifications (detection, localization, categorization and recognition) that can be framed in terms of learning and evaluating the likelihood p(I|c) of a class c where the class, together with the scene and the data, forms a Markov chain $c \to \xi \to I$. The task can then be framed in terms of minimizing the risk, or expected probability of error. For the sake of simplicity, as a way of example and not limitation, we consider the binary symmetric 0-1 risk, where $c \in \{0,1\}$ is one of two classes (for example, 0 corresponding to the absence, and 1 corresponding to the presence of a given object in a scene) and prior P(c)=½ (the object is equally likely to be present or absent).

A person with ordinary skill in the art will recognize that the design of a visual recognition system based on the teachings of this invention can be easily extended to the case where the prior is asymmetric, where multiple classes are present, or where different risk functionals are used. In any case, the data formation model informs the computation of the likelihood function p(I|c). This can be done either by marginalizing the unknown scene, corresponding to the hidden variables $\xi$, v, g, to obtain the maximum a-posterior (MAP) estimate, which requires knowledge of the class-conditional density $dP(\xi|c)$, as well as the priors dP(v) and dP(g). Alternatively, the likelihood can be obtained by a procedure known as "max-out" (Maximum-Likelihood (ML)) whereby the likelihood is maximized with respect to the unknown scene and nuisances (this is equivalent to marginalization when assuming uninformative priors). In either case, marginalization and max-out are complex procedures that cannot be pre-computed on training and test data independently, and therefore these approaches have severe limitations when it comes to implementing a visual recognition system on a mobile device, and more in general for interaction applications where a closed-loop system has to be implemented that provides a solution to the classification or regression problem with minimum latency.

2.2 Features and Templates

MAP and ML require costly computations at decision time, incompatible with real-time operation on a hand-held. A third approach to eliminating the nuisances can be applied, whereby the data (training and testing) is pre-processed to generate a statistic (a feature descriptor) that is as insensitive as possible to the nuisances, and at the same time as discriminative as possible, in the sense of resulting in the smallest possible increase in risk when compared with marginalization or max-out. Under certain conditions, such a loss can be made zero, so that the use of feature descriptors, as opposed to marginalization or max-out, is more efficient, and yet just as accurate. This is the case when all the nuisances have the structure of a group. When this is not the case, as in the presence of occlusions, quantization etc., one usually accepts a loss of performance in exchange for the benefit of reducing computation at decision time. In this case, one at least wishes to design the feature descriptor that is best, relative to the choice of classifiers.

It will be appreciated that the methods described herein are not restricted to algorithms that do not perform marginalization or max-out. Our invention also contemplates and is intended to include methods that use marginalization or max-out. It will further be appreciated that local canonization can be interpreted as a marginaliziation or max out, where the operation is performed relative to a finite selection process, as opposed to a search over the entire extent of the group orbits.

By way of example and not limitation, we restrict our attention herein to nearest-neighbor based rules and focus is directed on the design of the optimal representation $\hat{I}_c$. A person with ordinary skill in the art will recognize that the general methodology can be extended to other families of classifiers. For the case of nearest-neighbors, the optimal representation is a function of the distance between the data and a statistic that depends on the training set:

$$d(I,\hat{I}_c) \doteq \|I-\hat{I}_c\|^*. \quad (2)$$

It should be noted that the norm above can be defined in terms of any feature, in the sense that instead of computing the Euclidean distance between the (raw) image(s) and a representation, one can compute the distance between deterministic functions (features) of them. For example, one can compute the distance between features that are invariant, or insensitive, to nuisance factors. The section below describes how the best template can be computed, for the preferred embodiment using squared-norm distance between invariant features, absolute distance, or mode statistics.

2.2.1 Determining a "Best" Template

The "best" template, as we use the term, is the one that induces the smallest expected distance for each class, and depends on the distance function (or, more in general, the classifier); for the Euclidean case we have $$\hat{I}_c = \underset{I_c}{\operatorname{argmin}} \ E_{p(I|c)}[\|I - I_c\|^2] = \int_I \|I - I_c\|^2 \, dP(I \mid c). \quad (3)$$

The minimizer of the integral functional above is given in closed-form as $$\hat{I}_c = \int_I I \, dP(I \mid c) \simeq \sum_k h(g_k \xi_k, v_k) \quad (4)$$

where the sum approximates the integral on the left in the Monte Carlo sense given samples from the priors, available from the training set $g_k \sim dP(g)$, $v_k \sim dP(v)$, $\xi_k \sim dQ_c(\xi)$. It should be recognized that the averaging operation entails a loss of discriminative power, unless all nuisances have the structure of a group, so that the Best Template Descriptor (BTD0 is only "best" relative to the choice of classifier. As has been already pointed out, different classifiers yield different optimal templates. However, it will be recognized by the person versed in the art that the general construction above is still valid for more general families of classifiers. Even within nearest neighbors, different distances result in different representations. As alternative embodiments, the present invention can rely on either the mean (corresponding to a choice of $l^2$ norm) or the median (corresponding to $l^1$), or the mode of the likelihood or of the posterior density, or to any one statistic, including the entire distribution. For example, one could aggregate the distribution over time and compute the mode(s), or retain the entire distribution, as the descriptor. Correspondingly, comparison of descriptors at test-time is adapted to the choice of statistics, so if the entire distribution is sought, one would employ a distance or divergence measure between distributions, such as the Chi-square, Bhattacharyya, Wasserstein, or Kullbach-Liebler divergence. Regardless of the choice, the construction of the descriptor from multiple views is unchanged and therefore priority is sought for this process, that is significantly different from the comparison of statistics computed from single snapshot images. Some approaches perform computations to yield statistics that are "blurred" in a fashion that is related to the above, but substantially different in that they mimic the non-discriminative "blurring" part of the process in a way that is not specific to the three-dimensional geometry (shape) and photometry (albedo) of the object or scene of interest. In other words, in such approaches the blurring is done with respect to a generic distribution, rather than an object-specific one, and this causes a further loss of discriminative power. Also, in these cases the statistics are pooled in space from a single image, rather than in time or from multiple images, in order to construct the distribution (histogram) that represents the descriptor, or from which the descriptor is computed.

2.2.2 Case of Group Nuisances

In the case of group nuisances the distance on the quotient can be computed, $\|I - \hat{I}\|_{I/G} \doteq \|\phi(I) - \phi(\hat{I})\|$ to avoid blurring-out the group nuisances in the template, which yields an optimal (equi-variant) classifier (Theorem 2).

$$\phi(\hat{I}) \doteq \int \phi \circ h(\xi, v) dP(v). \quad (5)$$

In the description above, it has been implicitly assumed that the feature $\phi$ is a linear functional acting on the space of images. This was done for the sake of simplicity, not restriction; more in general, one of ordinary skill in the art will appreciate that we could extend the approach by considering $\hat{\phi}(I)$, rather than $\phi(\hat{I})$, without inducing substantial modification to our methodology. This shows that, whenever possible, group nuisances should be factored out in a template-based approach. If all the nuisances have the structure of a group, a template-based nearest-neighbor is an equi-variant decision rule and achieves optimality. This can be done for contrast and viewpoint away from visibility artifacts to give $$\phi(\hat{I}) = \phi(I) = h(\xi, 0), \quad (6)$$

which is what we will define as a "complete feature." Unfortunately, not all nuisances are groups, an issue addressed in a later section. The following section describes designing features $\phi$ for the group component of the nuisances.

2.3 Canonized Representations

In this section we describe how to design features for group nuisances that are guaranteed to retain optimality in the decision. The basic idea is that a group G acting on a space $\Xi$ organizes it into orbits $[\xi] \doteq \{g\xi \forall g \in G\}$, with each orbit being an equivalence class (reflexive, symmetric, transitive) representable with any one element along the orbit. Of all possible choices of representatives, a choice is made for one that is canonical, in the sense that it can be determined consistently for each orbit. This corresponds to cutting a section (or base) of the orbit space. All considerations (defining a base measure, distributions, discriminant functions) can be restricted to the base, which is now independent of the group G and effectively represents the quotient space I/G. An alternative is to use the entire orbit $[\xi]$ as an invariant representation, and then define distances and discriminant functions among orbits, for example through max-out, $d(\hat{\xi}_1, \hat{\xi}_2) = \min_{g_1, g_2} \|g_1 \xi, g_2 \xi\|$. The object being sought in canonization is to design a functional, referred to as a feature detector, which chooses a canonical representative for a certain nuisance g that is insensitive to, or ideally independent of, other nuisances. The next section discusses the issue of interaction of nuisances in canonization. Before that discussion, however, some nomenclature is introduced. A feature $\phi: I \to \mathbb{R}^F$ which comprises any deterministic function of the data taking values in some vector space $I \mapsto \phi(I)$ is G-invariant if $\phi \circ h(g\xi, v) = \phi \circ h(\xi, v)$, $\forall g \in G$ and $\xi$, v in the appropriate spaces. In other words, a feature is a function of the data that does not depend on the nuisance group. A trivial example of an invariant feature is any constant function. For group nuisances a complete (i.e., "discriminative" or "sufficient" or "distinctive") feature can be defined as one that captures the entire orbit: referring to Eq. (1) with v=0 (v≠0 is addressed in a later section) it is seen that $\phi: I \to \mathbb{R}^{dim(\Xi)}$ is complete if $[\phi \circ h(g\xi, 0)] \doteq \{g\phi \circ h(\xi, 0), \forall g \in G\} = [\xi]$. In other words, a complete feature is one that, in the absence of other nuisances, spans an entire orbit of the group. A complete invariant feature is the ideal representation, in the sense that it captures everything that is in the data except for the effect of G. Thus, the canonical representative $\hat{\xi}$ is defined as:

$$\hat{\xi} \doteq \phi(I) = \phi \circ h(g\xi, 0) = \phi \circ h(\xi, 0). \quad (7)$$

It should be noted in the above that the subscript c is dropped as well as the superscript from the template since $\phi(\hat{I}_c)$ is invariant to G regardless of the class c, and it is a sufficient statistic, with no approximation, when v=0.

One of many ways to design an invariant feature is to use the data I to "fix" a particular group element $\hat{g}(I)$, and then "undo" it from the data. If the data does not allow fixing a group element $\hat{g}$, this indicates it is already invariant to G. Therefore, we define a (co-variant) feature detector to be a functional designed to choose a particular group action $\hat{g}$, from which an invariant feature, or template, can be easily designed. It should be noted that this invariant feature or template is also often referred to as an invariant (feature) descriptor. It is noteworthy that both the detector and the descriptor are deterministic functions of the data, hence both are features.

Definition 1 of Co-Variant Detector: With reference to Eq. (1), a (G−) co-variant detector is any functional $\psi: I \times G \rightarrow \mathbb{R}^{dim(G)}$; $(I, g) \mapsto \psi(I, g)$ such that: (1) The equation $\psi(I, g) = 0$ uniquely determines a group element $\hat{g} = \hat{g}(I)$, and (2) $\psi(I, \hat{g}) = 0$, then $\psi(I \circ g, \hat{g} \circ g) = 0 \forall g \in G$, where $I \circ g$ is defined by $(I, g) = (h(\xi, 0), g) \mapsto h(g\xi, 0) \doteq I \circ g$.

The first condition (1) can be expressed in terms of "transversality" of the operator $\psi$: such as it is equivalent to the Jacobian being non-singular:

$$|J_g| \doteq \det\left(\frac{\partial \Psi}{\partial g}\right) \neq 0. \quad (8)$$

It can be said that the image I is G-canonizable, or is canonizable with respect to the group G, and $\hat{g} \in G$ is the canonical element, if there exists a covariant detector $\psi$ such that $\psi(I, \hat{g}) = 0$. Depending on $\psi$, the statistic may be local, such as only depending on I(x), $x \in B \subset \Omega$ on a subset of the image domain B; taking liberties with the nomenclature it could be generally said that region B is canonizable. The transversality condition Eq. (8) guarantees that $\hat{g}$ is an isolated (Morse) critical point of the derivative of the function $\psi$ through the Implicit Function theorem. So a co-variant detector is a statistic (a feature) that "extracts" an isolated group element $\hat{g}$. With a co-variant detector a complete invariant descriptor can be easily constructed as follows: For a given co-variant detector $\psi$ that fixes a canonical element $\hat{g}$ via $\psi(I, \hat{g}(I)) = 0$ the statistic, called a canonized descriptor, is given by:

$$\phi(I) \doteq \{I \circ \hat{g}^{-1}(I) | \psi(I, \hat{g}(I)) = 0\}. \quad (9)$$

It should be noted that this construction can be performed with respect to any finite-dimensional group, and even infinite-dimensional groups, acting both on the domain and on the range of the data space. By way of example and not of limitation, we consider the simplest group (planar translation of the image domain, and affine transformations of the image range), but the construction can be extended to Euclidean, similarity, affine, projective, and even diffeomorphic groups of the plane, and to arbitrary contrast transformation of the range (monotonic continuous maps).

According to our Theorem 1, it is asserted in the invention that canonized descriptors are complete invariants. Let $\psi$ be a co-variant detector. Then the corresponding canonized descriptor Eq. (9) is a complete invariant statistic.

2.3.1 Invariant Descriptors without Co-Variant Detectors

An alternate embodiment to design complete invariant features is without the use of a co-variant detector. For example, the curvature of the level lines or its dual, the gradient direction, is a complete contrast-invariant which does not require a detector. Indeed, even the first condition in the definition of a co-variant detector is not necessary in order to define an invariant descriptor: assume that the image I is such that for any functional $\psi$, the equation $\psi(I, g) = 0$ does not uniquely determine $\hat{g} = \hat{g}(I)$. That means that $|\nabla \psi| = 0$ for all $\psi$, and therefore all statistics already (locally) invariant to G. More generally, where the structure of the image allows a stable and repeatable detection of a reference frame $\hat{g}$, this can be inverted and canonized $\phi(I) = I \circ \hat{g}^{-1}$. Where the image does not support the detection of a frame $\hat{g}$, it means that the image itself is already invariant to G. Note that we use the term "co-variant frame" or "canonical frame" since, as customary in group theory, a group element identifies a reference frame for the space where the group operates. For example, an element of the translation group identifies a reference frame by means a point (the origin of the reference frame). Similarly, an element of the affine group identifies an affine reference frame etc. Therefore, canonical group element and canonical reference frame are equivalent and interchangeable terms.

The definition of canonizability, and its requirement that $\hat{g}$ be an isolated critical point, would at first appear to exclude edges and ridges, and in general co-dimension one critical loci that are not Morse. However, this is not the case, because the definition of critical point depends on the group G, which can include discrete groups (thus capturing the notion of "periodic structures," or "regular texture") and sub-groups of the ordinary translation group, for example planar translation along a given direction, capturing the notion of "edge" or "ridge" in the orthogonal direction. In any case, it is beneficial when a complete invariant can be designed.

The use of canonization to design invariant descriptors requires the image to support "reliable" (in the sense of Definition 1) co-variant detection. Based on the discussion above, it is clear that the challenge in canonization is not when the co-variant detector is unreliable, for that implies the image is already "insensitive" to the action of G. Instead, the challenge is when the covariant detector reliably detects the wrong canonical element $\hat{g}$, for example where there are multiple repeated structures that are locally indistinguishable, as is often the case in cluttered scenes (as addressed in a later section). It is enough at this point to realize that when canonization works, it simplifies visual classification by eliminating the group nuisance without any attendant loss of performance.

Theorem 2 determines when a template is optimal. Theorem 2 is that, if a complete G-invariant descriptor $\hat{\xi} = \phi(I)$ can be constructed, a classifier based on the class-conditional distribution $dP(\hat{\xi}|c)$ attains the optimal (Bayes) risk.

So far it has been assumed that the non-group nuisance is absent, such that v=0, or that more generally, the canonization procedure for g is independent of v, or "commutes" with v, in a sense that is made precise in Definition 2. This is true for some nuisances, but not for others, even if they have the structure of a group, as will be seen in the next section. In the next section we show what groups can be canonized.

2.4 Interaction of Invertible and Non-Invertible Nuisances

The previous section described canonization of the group nuisance $g \in G$ in the absence of other nuisances v=0. In general, this is not the case because some nuisances are clearly not invertible (occlusions, quantization, additive noise), and therefore they cannot be canonized. What is worse, with or without canonization, one simply cannot construct a complete invariant to occlusions or to quantization. In this section, the interaction between invertible and non-invertible nuisances is dealt with so the condition v=0 is relaxed and feature detectors described which "commute" with v. The only subgroup of G that has this property is the isometric group of the plane.

The condition is now relaxed that v=0; the maps $I \circ g \dot{=} h(g\xi, 0)$ and $I \circ v \dot{=} h(\xi,v)$ can be composed, $I \circ g \circ v = h(g\xi,v)$, but in general, they do not commute. When they do commute, $I \circ g \circ v = I \circ v \circ g$, it can be said that the group nuisance g commutes with the (non-group) nuisance v.

Definition 2 of a Commutative Nuisance: A group nuisance $g \in G$ commutes with a (non-group) nuisance v if the following condition is met:

$$I \circ g \circ v = I \circ v \circ g. \qquad (10)$$

It should be noted that commutativity does not coincide with invertibility; as a nuisance can be invertible, and yet not commutative (e.g., the scaling group does not commute with quantization), although vice-versa any commutative nuisance must be invertible (it must be a group).

For a nuisance to be canonizable (and therefore amenable to being eliminated via pre-processing without loss of discriminative power) it has to be invertible and commutative. This is the case only for the isometric group of the plane. It is recognized that, in the literature on scale selection (e.g., Lindeberg, SIFT), scale selection is advocated on the ground that scale is a group. However, scale composed with quantization is not a group, but rather a semi-group. In other words, scale does not commute with quantization. Therefore, (single) scale selection is not advisable; instead, sampling of scales is the method of choice in the preferred embodiment, whereby the semi-group structure of scale is respected.

In view of Theorem 2, it will be appreciated that an equi-variant classifier via a co-variant detector and invariant descriptor can only be designed for canonizable and commutative nuisances. All other nuisances should be handled through the use of marginalization or extremization in order to retain optimality (minimum risk).

Theorem 3 according to the invention aids in determining what is to be canonized. Theorem 3 is that the only nuisance that commutes with quantization is the isometric group of the plane (rotations, translations and reflections).

As a corollary, the affine group, and in particular its scaling sub-group, can not be eliminated in the representation without a loss of discriminative power. This is unlike what is taught and used in the art, which fails to explicity include quantization in their analysis. The additive residual n(x) does not pose a significant problem in the context of quantization since it is assumed to be spatially stationary and white/zero-mean, so quantization actually reduces the noise level:

$$n(x_i) = \int_{B_\sigma(x_i)} n(x) q \, dx \xrightarrow{\sigma} 0. \qquad (11)$$

Instead, the other important nuisance to understand is occlusion.

Planar rotations commute with occlusions and quantization at first approximation. A number of rotation co-variant detectors can be employed, such as the direction of maximum gradient, or the dominant orientation, or the direction of the longest edge, etc. In alternate embodiments, when the objects or scenes to be recognized are not "detachable", instead of utilizing a co-variant detector as a canonization mechanism, the present invention utilizes the projection of the gravity vector onto the image plane. Specifically, the projection of the gravity vector onto the image plane is used as a canonical direction, in lieu of the output of a co-variant detector. Alternate external canonization mechanisms include the ordinate axis of the image, or a gravity sensor. The above is a valuable consideration, that the use of the gravity reference from sensors on the portable device is utilized in order to cannonize rotation. While translation commutes with quantization, it does not commute with occlusion, and therefore it should be marginalized or eliminated at decision time. However, the canonization process can still help the marginalization or max-out process by reducing it to a combinatorial hypothesis test as described in the next section. In this sense, it can be generally said that translation is locally canonizable. The next section takes this analysis one step closer to implementation.

Definition 3 of Local Canonizability. An image is locally canonizable according to Definition 3 with respect to a group G if it is a Morse function of $g \in G$. Stated another way, the function $I \circ g$ has isolated critical points when considered as a function of g. Note, however, that such points may not be a global extremum of the co-variant detector functional.

The description of an image around each $x_i$ at each scale $\sigma_j$ can be made invariant to translation, unless the region of size $\sigma_j$ around $x_i$ intersects the occlusion domain $D \subset \Omega$, which is a binary choice that can only be made at decision time, and not by pre-processing.

In view of the above, it will be appreciated that although translation is not globally canonizable, its treatment will be referred to herein as local canonization modulo a selection process to determine whether the region around the canonical representative is subject to occlusion or other non-invertible nuisance.

2.5 Designing Feature Detectors

Proper design of a feature detector involves canonizing the canonizable/commutative nuisances in a way that is the least "sensitive" to the other ones. Sensitivity is sometimes captured by the notion of Bounded-Input Bounded-Output (BIBO) stability. However, this is not meaningful in the context of visual recognition, since any co-variant detector as defined in Definition 1 is necessarily BIBO stable. Instead, a different concept stability in introduced which is more relevant to recognition.

Definition 4 is directed at structural stability. A G-covariant detector $\psi|\psi(I,\hat{g}(I))=0$ is Structurally Stable if small perturbations $\delta v$ preserve the rank of the Jacobian matrix of Eq. (8) as follows:

$$\exists \delta > 0 \mid |J_{\hat{g}}| \neq 0 \Rightarrow |J_{\hat{g}+\delta\hat{g}}| \neq 0 \ \forall \ \delta v \mid \|\delta v\| \leq \delta \qquad (12)$$

with $$\delta \hat{g} \dot{=} |J_{\hat{g}}|^{-1} \frac{\partial h}{\partial v} \delta v.$$

In other words, a detector is structurally stable if small perturbations do not cause singularities in canonization. In other words, while BIBO sensitivity pertains to the co-variant detector frame "moving", structural sensitivity pertains to the co-variant detector "jumping" around in the domain of the data. The maximum norm of the nuisance that does not cause a singularity in the detection mechanism is referred to herein as the structural stability margin, which is utilized herein to rank features in the following section, and is given by the following:

$$\delta^* = \sup \|\delta v\| \| |J_{\hat{g}+K\delta v}| \neq 0. \qquad (13)$$

It is important to note that structural stability margin is utilized to rank features, so that if a complexity bound is imposed by resource constraints, one can choose the N best features, according to this criterion.

Example 1 (Translation-scale group). By way of example, and not of limitation, consider the set of images, intended as functions from the real plane to the positive reals, approximated by a sum of Gaussians. The image is then represented by the centers of the Gaussians, $\mu_i$, their covariance $\sigma_i^2$ and the amplitudes $\alpha_i$, so that $I(x)=\Sigma_i \alpha_i G(x-\mu_i;\sigma_i^2)$. Consider a detection mechanism that finds the extrema $\hat{g}=\{\hat{x},\sigma\}$ of the image convolved with a Gaussian centered at $\hat{x}$, with standard deviation $\sigma$: $\psi(I,\hat{g}) = I*\nabla G(x-\hat{x};\sigma^2)=0$. Among all extrema, consider the two $\hat{x}_1$, $\hat{x}_2$ that are closest. Without loss of generality, modulo a re-ordering of the indices, let $\mu_1$ and $\mu_2$ be the "true" extrema of the original image. In general $\hat{x}_1 \neq \mu_1$ and $\hat{x}_2 \neq \mu_2$. Let the distance between $\mu_1$ and $\mu_2$ be $d=|\mu_2-\mu_1|$, and the distance between the detected extrema be $\hat{d}=|\hat{x}_2-\hat{x}_1|$. Translations along the image plane do not alter the structural properties of the detector ($\hat{d}$ does not change). However, translations orthogonal to the image plane do. These can be represented by the scaling group $\sigma$, and in general $\hat{d}=\hat{d}(\sigma)$ is a function of $\sigma$ that starts at $\hat{d}=d$ when $\sigma=0$ and becomes $\hat{d}=0$ when $\sigma=\sigma^*$, such as when the two extrema merge in the scale-space. In this case, $\delta^*=\sigma^*$ is the structural stability margin. It can be computed analytically for simple cases of Gaussian sums, or it can be visualized as customary in the scale-space literature. It is the maximum perturbation that can be applied to a nuisance that does not produce bifurcations of the detector. It should be recognized that one could also compute the structural stability margin using Morse's Lemma, or the statistics of the detector (e.g., the second-moment matrix). From the foregoing, those skilled in the art will appreciate from Persistent Topology that other methods to quantify the life span of structures can be used as a proxy of structural stability margin.

A sound feature detector is one that identifies Morse critical points in G that are as far as possible from singularities. Structural instabilities correspond to aliasing errors, or improper sampling, where spurious extrema in the detector $\psi$ arise that do not correspond to extrema in the underlying signal (the scene radiance). Proper sampling depends on the detector functional $\psi$, that in the presence of quantization depends on the scale $\sigma$ (the area of the support of the quantization kernel). Thus the ideal detector is one that chooses $\hat{g}$ that is as far as possible from singularities in the locus $\hat{g}|\psi(I,\hat{g})=0$. The selection of canonical frames according to this principle is described in the next section. It will be noted that a canonical frame $\hat{g}$ is often referred to as a "feature point" or "keypoint" or "corner", which is an inappropriate nomenclature unless G is restricted to the translation group. One should not confuse a (canonical reference) frame $\hat{g}$ from a (video) frame, which is an image $I_t$ that is part of a sequence $\{I_t\}_{t=1}^T$ obtained sequentially in time. Which type of "frame" being referred to herein should be clear from the context and discussion herein.

2.6 Proper Sampling and Correspondence

In traditional signal processing, proper sampling refers to regular sampling at twice the Nyquist frequency. This is irrelevant in recognition, where the task is not to reconstruct an exact copy of some "true" image (the scene radiance). A more appropriate condition of proper sampling is for a feature detector $\psi(I,\hat{g})=0$ for example for the location-scale group $g=\{x,\sigma\}$ to be topologically equivalent to the "true" image $\psi(h(\xi,0),\hat{g})=0$. In other words, an image is properly sampled if a covariant detector operating on the image (irradiance) yields identical results as if it was operating on the scene (radiance). For the case of invariance to general viewpoint changes, the Attributed Reeb Tree (ART) known to those skilled in the art is a maximal contrast-viewpoint invariant away from occlusions, so the outcome $\hat{g}=\{\hat{x}_i,\sigma\}$ of any feature detector $\psi(I,\hat{g})=0$ operating at a scale $\sigma$ can be written in terms of the ART: $\{\hat{x}_i\}_{i=1}^N=\text{ART}(I*G(x;\sigma^2))$. Thus proper sampling can be tested by comparing the ART computed on the image and, if it was possible, the ART computed on the scene radiance, a statement that can be summarized as follows:

Theorem 4: A signal I is properly sampled at $\sigma$ if and only if $\text{ART}(h(\xi,0)*G(x;\sigma^2))=\text{ART}(I*G(x;\sigma^2))$.

In principle, any number of efficient techniques for critical point detection could be used to compute the ART and test for proper sampling. Unfortunately, there is no access to the "true" image $h(\xi,0)$ (the scene radiance). Unlike classical sampling theory, there is no "critical frequency" beyond which one is guaranteed proper sampling, because of the scaling/quantization phenomenon. However, under the Lambertian assumption, topological equivalence between an image and the scene is equivalent to topological equivalence between different images of the same scene, for example the next image $I_{t+1}(x)$. This concept highlights the importance of framing the recognition problem, and in particular the training phase, in an active setting, and of using video in place of isolated snapshots.

Definition 5 for Proper Sampling. It is asserted herein that a signal $\{I_t\}_{t=1}^T$ is properly sampled at scale $\sigma$ at time t if the ART of $(I_t*G(x;\sigma^2))$ is equal to that of $(I_{t+1}*G(x;\sigma^2))$.

Of course, occlusions yield a signal that is not properly sampled, which leads to failure of the combinatorial matching test of two local invariant features at decision time, which is precisely what is desired. In other words, a signal is properly sampled in space and time if the feature detection mechanism is topologically consistent in adjacent times at a specific scale. This means that, at a given location, within the simply connected region corresponding to a given isolated extremum on one video frame, there is one and only one extremum on the subsequent video frame. If more, or no, extrema are present, then there is no correspondence, and the first extremum cannot be put into correspondence with any structure in the underlying scene. It should be understood that in the complete absence of motion, proper sampling cannot be ascertained. However, complete absence of motion is only real when one performs the operations based on a single image, as a continuous capture device will always have some (possibly infinitesimal) motion (or even noise) making two adjacent images different, and therefore the notion of topological consistency over time meaningful, since extrema due to noise will not be consistent, as noise yields independent realization of a stochastic process that, in general, will not yield consistent response to a co-variant detector. The above consideration again points to the importance of using video (or multiple images of the same scene where local correspondence between co-variant frames has been established, for example by an external mechanism) during training, as opposed to isolated snapshots. It will be noted that the position of extrema will in general change due to both the feature detection mechanism, and also the inter-frame motion. Once again it is seen that a very important element in the context of the present invention is the structural integrity (stability) of the detection process, for example its topology, rather than the actual position (geometry). If a catastrophic event happens between time t and t+1, for example, the fact that an extremum at scale $\sigma$ splits or merges with other extrema, then temporal correspondence (tracking) cannot be established, and instead the entire ARTs have to be compared across all scales in a complete graph matching problem. For this reason, the following definition of trackability is introduced.

Definition 6 is of Trackability. A region of the image $I_{t_B}$ is considered trackable if there exists a scale σ at which it can be properly sampled.

Remark 1 on Occlusions. It will be first noted that occlusions do, in general, alter the topology of the feature detection mechanism, hence the ART. Therefore, they cannot be properly sampled. This is not surprising, as occlusions are not trackable, reflecting the fact that correspondence cannot be established for regions that are visible in one image (either $I_t$ or $I_{t+1}$) but not the other.

The present invention teaches that anti-aliasing in space can lead to proper sampling in time. Assuming continuity and a sufficiently slow motion relative to the temporal sampling frequency, usually it is possible to determine a large-enough scale $\sigma_{max}$ such that the video signal is properly sampled at that scale. This is relevant because, typically, temporal sampling is performed at a fixed rate, and it would of course be undesirable to perform temporal anti-aliasing by artificially motion-blurring the images, as this would destroy spatial structures in the image. It should be noted, however, that once a sufficiently large scale is found, correspondence can be established at the scale $\sigma_{max}$, wherein motion $\hat{g}_t$ computed at that scale can be compensated (i.e. locally canonized), and therefore the (back-warped) images $I_t \circ \hat{g}_t^{-1}$ can then be properly sampled at a scale σ≤$\sigma_{max}$. This procedure can be iterated, until a minimum $\sigma_{min}$ can be found beyond which no topological consistency is obtained. It will be appreciated that $\sigma_{min}$ may be smaller than the native resolution of the sensor, leading to a super-resolution phenomenon. This phenomenon makes sense in the explorative framework of Actionable Information, where one can make the Actionable Information Gap smaller and smaller by getting closer and closer to objects of interest in the scene.

Those skilled in the art will appreciate that certain elements of the system are interchangeable, such as, for example, the feature detector or the tracking mechanism. In one embodiment, we have described the invention in terms of using "FAST" corners (http://mi.eng.cam.ac.uk/~er258/work/fast.html). However, it will be appreciated by those skilled in the art that any low level detector can be used. Examples include, but are not limited to, Harris corner, Laplacian of Gaussian, etc.

This analysis in the previous sections forms the basis of the integrated approach to selection and tracking within the present invention which is referred to herein as "Tracking on the Selection Tree" (TST). In this approach, one first selects structurally stable features through proper sampling. There are a number of possible mechanisms to perform such co-variant detection step, and our approach can use any of them in an interchangeable manner. What is important is how these are used. The structural stability margin determines the neighborhood in the next image where independent selection is to be performed. If the procedure yields precisely one detection in this neighborhood, topology is preserved, and proper spatio-temporal sampling is achieved. Otherwise, a topological change has occurred, and no tracking is performed. This procedure is performed first at the coarsest level, and then propagated at finer scales by compensating for the estimated motion, and then re-selecting at the finer scales.

Note that this invention teaches multi-scale feature detection using a translation-covariant detector. However, rather than joint location-scale canonization, that violates the semi-group structure of scale, this is done by locally canonizing translation at each scale, with the canonical frame existing only at the scale at which the corresponding co-variant detector is structurally stable. This is unlike previous approaches whereby corners are selected at all scales, and then their position tracked across scales all the way to the native scale of the sensor, with the result that non-existent frames (frames that did not correspond to a canonical co-variant detection at the native resolution of the sensor) were tracked.

An exemplary embodiment of our Tracking on the Section Tree (TST) algorithm is shown in the pseudocode of FIG. 1 with an associated block diagram shown in FIG. 2. This same pseudocode is also shown in Table 1. A multiple-scale image pyramid is constructed for each image by blurring and down-sampling. The following procedures are performed from the coarsest scale $\sigma_{max}$ to the finest scale $\sigma_{min}$. First, features are selected at each scale of the image pyramid. A feature from a higher scale is called a parent feature if it covers the feature at a lower scale. If such a parent feature exist for the features at the current scale, the motion of a parent feature is propagated by back-warping the image or initializing the motion estimation of the current feature. Then the features are tracked to another image using, for example, a translational model in the preferred embodiment. The tracking quality at each scale is further verified by imposing geometric or photometric consistency. Tracking terminates at the finest scale. It should be appreciated, however, that TST is not limited to a transitional model. For example, at each scale, the low-level tracking can be more sophisticated than a transitional model, such as similarity, affine, or projective.

Referring also to FIG. 2, an embodiment of a workflow 100 for the inventive methods and apparatuses is illustrated. It should be appreciated that the present invention can be embodied without limitation as a system, apparatus, device, and/or method, and that the following description is by way of example and not of limitation.

First, capturing of a video frame is performed 102. In general, when a video frame is captured, an image pyramid is built 104 to provide multi-scale image samples for further stages of processing. Features are selected 106, including the detection of corner features from each level of the image pyramid as multi-scale corner features, and these features are tracked 110 between consecutive frames by a TST tracking algorithm 108 or other optical flow-based tracking algorithm. With the aid of an outlier rejection algorithm, the robustness of feature tracking can be improved.

In order to perform object recognition, feature descriptors are first calculated 112, such as including the multi-scale corner features, from information from the image pyramid 104. Features selection 106 is performed, as well as TST or other optical flow-based tracking 108. The descriptors are then quantized 114 for the purpose of dimensionality reduction such as using a vocabulary tree. The results of the quantization are then used for spatial aggregation 116 such as online learning of "bag-of-features" (e.g., similar to bag-of-words) object models, and for recognizing the objects using a classification scheme 118 such as term frequency-inverse document frequency (TF-IDF) scoring. It will be noted that online learning 120 is performed from the results of spatial aggregation 116, while object recognition 122 is performed from the results of classification 118.

Figure 3C:
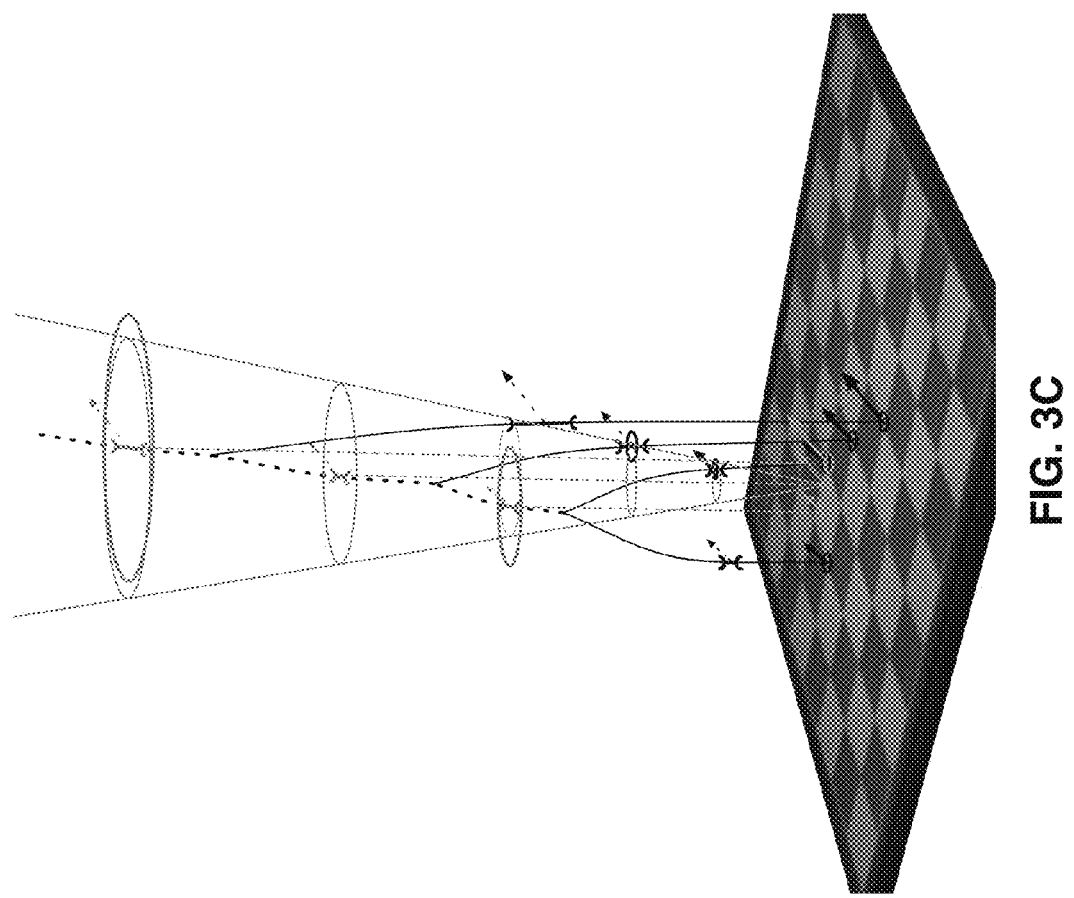
Figure 3D:
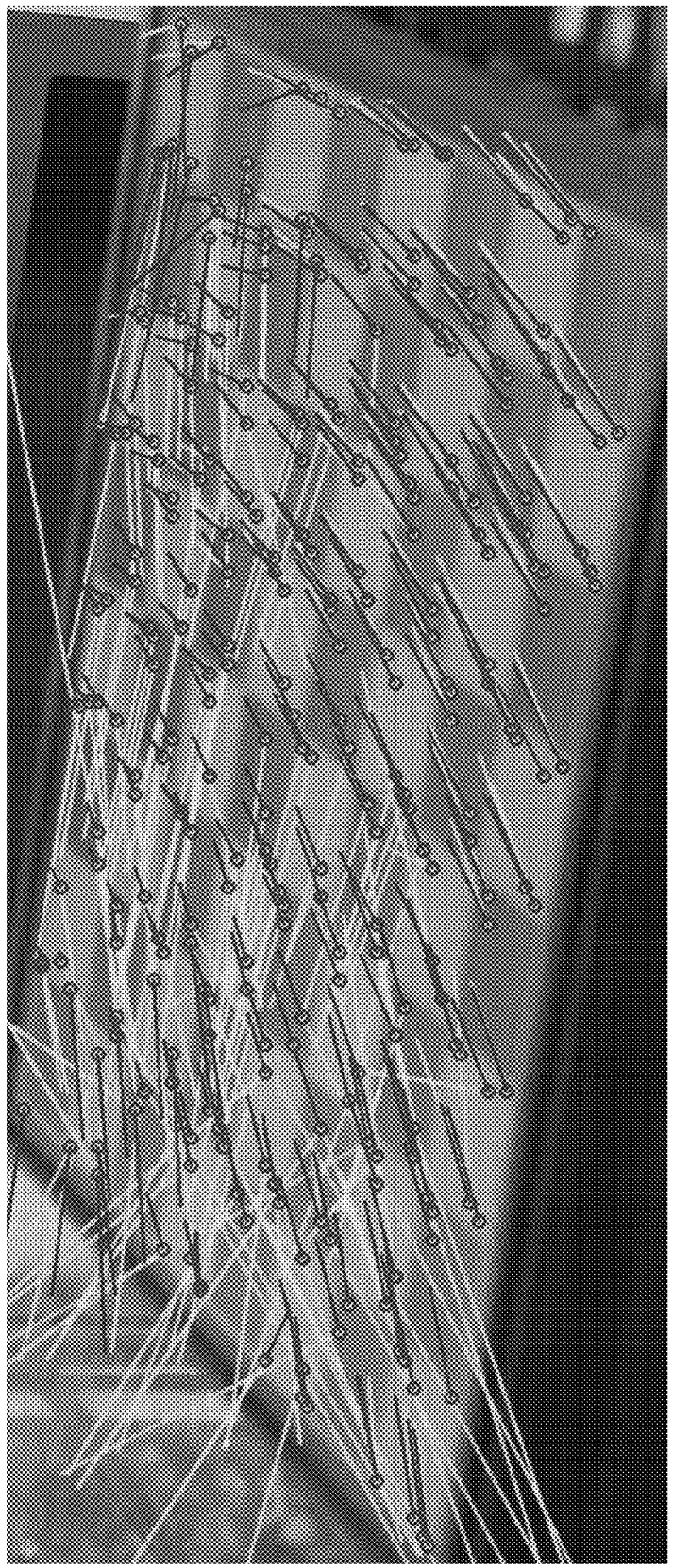

FIG. 3A through FIG. 3D illustrate Tracking on the Selection Tree (TST) according to an embodiment of the invention. The approach advanced herein only provides motion estimates at the terminal branches (finest scale); while the motion estimated at inner branches is used to back-warp the images so large motion would yield properly-sampled signals at finer scales in FIG. 3A. In an alternative embodiment, the motion estimated at inner branches can also be returned, together with their corresponding scale in FIG. 3B. The alternative traditional multi-scale detection and tracking first "flattens" all selections down to the finest level (dashed vertical downwards lines), then for all these points considers the entire multi-scale cone above (shown only for one point for clarity). As a result, multiple extrema at inconsistent locations in scale-space are involved in providing coarse-scale initialization in FIG. 3C. Motion estimates at a scale finer than the native selection scale (shown as the thinner ellipse), rather than improving the estimates, degrade them because of the contributions from spurious extrema (wider ellipses). Motion estimates are seen in FIG. 3D.

2.6.1 Tracking on Selection Tree

The goal of tracking is to provide reference frames (in the specific example illustrated here these are relative to the similarity group) $\hat{g}_{ij} = \{x_i, \sigma_{ij}, R_{ij}\}$, centered at $x_i$, with size $\sigma_{ij}$ and orientation $R_{ij}$. Because of temporal continuity, the class label c is constant with high probability during inter-frame motion. It should be noted that the above temporal continuity of the class label does not prevent the data from being discontinuous as a function of time, owing for example to occlusion phenomena. However, one can generally infer a description of the scene $\xi$, and of the nuisances g, v from these continuous data, including occlusions. If this were not the case, for example if the scene and the nuisances cannot be inferred from the training data, then the dependency on nuisances cannot be learned. In this sense, time acts as a "supervisor" or a "labeling device" that provides ground-truth training data. The local frames $g_k$ now must be co-detected in adjacent images. Therefore, the notion of structural stability and "sufficient separation" of extrema depends not just on the spatial scale, but also on the temporal scale. For example, if two 5-pixel blobs are separated by 10 pixels, they are not sufficiently separated for tracking under a 20-pixel inter-frame motion.

Thus the ability to track depends on proper sampling in both space and time, which yields the following stepwise approach to multi-scale tracking:

1. Construct a spatial scale-space, until the signal is properly sampled in time. This is generally guaranteed as diffusion will eventually make the signal arbitrarily low-pass.

2. Estimate motion at the coarser scale, with whatever feature tracking/motion estimation/optical flow algorithm is desired. The simplest can be used as described later, because the proper sampling condition is satisfied both in space and time. In practice, there is a trade-off, as in a limit too smooth a signal will fail the transversality condition and will not enable establishing a proper frame $\hat{g}$.

3. Propagate the estimated motion in the region determined by the detector to the next scale. At the next scale, there may be only one selected region in the corresponding frame, or there may be more (or none), as there can be singular perturbations (bifurcations, births and deaths).

4. For each region selected at the next scale, repeat the process from step 2.

It should be noted that only the terminal branches of the selection scale-space provide an estimate of the frame $\hat{g}$, whereas the hidden branches are only utilized to initialize the lower branches, to make the back-warped signal properly sampled. Alternatively, one can report each motion estimate at the native selection scale as seen in FIG. 3B. This is different than multi-scale tracking as traditionally performed, whereby features are selected at multiple scales, then the scale-space is flattened as seen by the dashed lines FIG. 3B, and then each of the resulting feature points (now the nomenclature of "point" is appropriate, as scale has been removed from the detected frames) are tracked in scale-space.

This form of tracking is referred to as Tracking on the Selection Tree (TST), because it is based on proper sampling conditions and tracking is performed at each native selection scale. Not only is the proper algorithm more accurate, but it is also faster because it avoids computations up and down the multi-scale pyramid where it is unnecessary and where, because of improper sampling, it is detrimental due to aliasing errors.

It will be appreciated that once training using a sufficient sampling of the nuisance distribution has been performed at least once, and is encoded in the training set, then classification can be performed on a snapshot datum, for example comprising a single picture.

The optimal descriptors described in the construction above are optimal under the condition that a fair sample from the nuisance distribution is given. This means that the "input" to the system is "sufficiently exciting", using statistical system identification parlance. In the preferred embodiment, the system relies on an intelligent human user to sample the nuisance distribution to a sufficient extent. This also means that the user moves sufficiently around the object or scene that is being learned. In alternate preferred embodiments, where training is performed in an automated fashion, for example by means of a robot, algorithmic provisions should preferably be in place to ensure that sufficient sampling is performed. When such a sufficient sampling is not provided, for example when only one image is available, or where the multiple images do not span a sufficiently diverse range of vantage points, the resulting representation will be discriminative for the given object or scene only under a range of viewpoint variations that is sufficiently well represented in the training set.

2.7 Local Invariant Frames

From the previous section it has been seen that translation is locally canonizable within an unoccluded domain. In a later section multiple canonical representatives for translation are first found, then these are sorted in order of separation from other extrema to guarantee (local) structural stability; while scale is not canonizable in the presence of quantization. Instead, the scale-quantization semi-group can be sampled at multiple scales starting from the native resolution of the sensor. Three options are possible at this point: (a) one can jointly locally canonize translation and scale, or (b) one can first canonize translation (by feature selection at the finest scale) and then sample scale (by computing a local description across scales of the same point in space), or (c) first canonize or sample scale, and then for each sample scale canonize translation. We found that (a) provides a good selection strategy only for blobs.

In one embodiment, a fixed sampling of scale is utilized as dictated by the computational limitations; wherein rotation is canonizable in the local frame determined by translation and scale, with a variety of canonization mechanisms. However, the projection of the gravity vector onto the image plane provides a natural canonical direction for non-detached objects, which is later used since an estimate of gravity is available from inertial (acceleration) sensors.

The selection procedure yields a topological tree in scale-space with locations $\{x_i\}_{i=1}^N$ and, for each location, multiple scales $\{\sigma_{ij}\}_{i,j=1}^{N,M}$. Once rotation is canonized using gravity as a reference, then a collection of similarity (reference) frames $\hat{g}_{ij} = \{x_i, \sigma_{ij}, R_{ij}\}$ exists with each identifying a region $B_{\sigma_{ij}}(x - R_{ij}x_i)$, where a complete contrast invariant can be computed as in Eq. 14 below. It should be noted that alternative contrast-invariant mechanisms include local contrast normalization or spectral ratios computed from color images.

$$\phi(I) = \left\{ \frac{\nabla h(\hat{g}_{ij}\xi, v)}{\|\nabla h(\hat{g}_{ij}\xi, v)\|} = I \circ \hat{g}_{ij}(x) \doteq \phi_{ij}(I) \right. \tag{14}$$

-continued $$\forall x \in B_{\sigma_{i,j}}(x - R_{i,j}x_i).\Big\}_{i,j=1}^{N,M}.$$

The feature φ(I) is now a multi-component descriptor for the entire image I. This is, by construction, invariant to similarity transformations of the image domain (translation, rotation and scale) and contrast-transformations of the image range. Non-invertible nuisances are not canonizable and must be marginalized or eliminated at decision time. In particular, occlusions are marginalized utilizing a combinatorial matching test of collections of features $\{\phi_{ij}(I)\}$ in different images. Arbitrary changes of viewpoint correspond to diffeomorphic domain deformations that do not constrain the frames $\{\hat{g}_{ij}\}$, making the collection $\{\phi_{ij}(I)\}$ a bag of features. As an alternative to completely discarding the spatial arrangement of feature descriptors, in alternate embodiments one can use proximity distribution kernels that encode general neighborhood relationships between collections of feature descriptors. In alternate embodiments, one could restrict the allowable scenes geometry, and correspondingly the domain deformations to be affine or projective, in which case marginalization can be performed as a geometrically-validated matching test, by comparing configurations of local reference frames $\{\hat{g}_{ij}(t)\}$ in different images. In particular, one makes the hypothesis that there exists a homography H such that $x_i(t+1) \sim Hx_i(t)$ for a subset of $i=1, \ldots, N$, with $\hat{g}_i(t)=\{x_i(t),\sigma_{ij}(t),R_{ij}(t)\}$. Putative correspondences $(i,j)_{(t)} \leftrightarrow (1,m)_{(t+1)}$ that violate this hypothesis are rejected as outliers, and the hypothesis testing can be performed with a variety of hypothesis testing schemes known to those skilled in the art.—This stage is generally too costly to implement on a hand-held device at the current computational capabilities of commercially available units. Therefore, in a preferred embodiment, this is replaced with a simpler test described for the present invention within the implementation section. Feature descriptors computed on a test image should preferably be compared with the best descriptor learned from the training set.

2.8 Learning Best-Template Descriptors

In order to compute the best template in Eq. (4), one needs to average with respect to the nuisances that have not been canonized. The prior dP(v) is generally not known, and neither is the class-conditional density $dQ_c(\xi)$. However, if a sequence of frames $\{\hat{g}_k\}_{K=1}^T$ has been established in multiple training images $\{I_k\}_{k=1}^T$, with $I_k=h(g_k\xi_k,v_k)$, then it is easy to compute the best (local) template by averaging, in the case of $l^2$, or computing the median in the case of $l^1$ $$\hat{I}_c = \int_I I\, dP(I\mid c) \quad (15)$$
$$= \sum_{\substack{v_k \sim dP(v) \\ \xi_k \sim dQ_c(\xi)}} \phi \circ h(\hat{g}_k \xi_k, v_k)$$
$$= \sum_k I \circ \hat{g}_k$$
$$= \sum_{k,i,j} \phi_{ij}(I_k)$$

where $\phi_{ij}(I_k)$ are defined in Eq. (14) for the k-th image $I_k$. Alternatively, one can compute the mode of the histogram, or retain the entire histogram as the descriptor. A sequence of canonical frames $\{\hat{g}_k\}_{i=1}^T$ is the outcome of a tracking procedure. It will be appreciated that we are tracking reference frames $\hat{g}_k$, not just their translational component (points) $x_i$, and therefore tracking has to be performed on the selection tree as seen in FIG. 3A through FIG. 3C. The template above $\hat{I}_c$, therefore, is an averaging (or median, or mode, or histogram) of the gradient direction (a complete contrast invariant), in a region determined by $\hat{g}_k$ (a co-variant frame), according to the nuisance distribution dP(v) and the class-conditional distribution $dQ_c(\xi)$ as represented in the training data. This "best-template descriptor" (BTD) is described in a later section on implementation. The BTD uses gradient orientations, but instead of performing spatial averaging by coarse binning or other generic (non object-specific) distribution, it uses the actual (data-driven) measures and average gradient directions weighted by their standard deviation over time. The major difference is that composing the template of the present invention requires local correspondence, or tracking, of local regions $g_k$, in the training set. If one is given just one image, such motion of local regions $g_k$ should preferably be "hallucinated" or somehow simulated, which is what most single-image descriptors actually do, even if implicitly.

In the present invention, once the template descriptor is learned, with the entire scale semi-group spanned in dP(v), recognition can be performed by computing the descriptors $\phi_{ij}$ at a single scale (that of the native resolution of the pixel). Of course, one can also compute descriptors at multiple scales, and at multiple images. It should be noted that descriptors can be computed provided a sufficiently rich training set. However, certain group components, for example scale, can be synthetically generated or approximated, for example by extending the data to a Gaussian pyramid in post-processing. This significantly improves the computational speed of the method, which in turn enables real-time implementation on a hand-held device. Of course, such a synthetic extension is not possible for non-invertible, non-commutative nuisances such as occlusions.

2.9 Learning Priors and Categories

Instead of having to learn the priors for each object separately during training, we can exploit the training of multiple objects to learn priors that can be shared among multiple objects or categories. Assuming canonizable nuisances have been eliminated (although this is not strictly necessary, hence we will maintain the notation g,v for all nuisances), the learning procedure consists in solving, to the extent possible, for the model parameters $$\hat{\xi}, \hat{g}_k, \hat{v}_k = \arg\min_{\xi, g_k, v_k} \|I_k - h(g_k\xi, v_k)\|_* \quad (16)$$

where we have assumed that $n(\cdot) \sim N(\|\cdot\|)$, so the maximum-likelihood solution corresponds to the minimum norm solution, and where the norm $\|\cdot\|_*$ can be the standard Euclidean norm in the embedding space of all images $\|I-J\|_*=\|I-J\|$, or if some nuisances have been canonized, it can be a (cordal or geodesic) distance on the quotient $I/\tilde{G}$, where $\tilde{G} \subset G$ is the group that has been canonized, or $\|I-J\|_*=\|\hat{\xi}(I)-\hat{\xi}(J)\|$ for the case of a cordal distance.

The problem in Eq. (16), for the Ambient-Lambert case, has been discussed in the literature in the presence of one or multiple occluding layers, respectively, and in particular it can be shown to be equivalent (under the Lambertian assumption) to image-to-image matching as described in a previous section. Once TST has been performed (yielding $\hat{g}_i$), and the residual computed (yielding $\hat{v}_i$), sample-based approximations for the nuisance distributions can be obtained, for example according to $$dP(v) = \sum_i \kappa_v(v - \hat{v}_i) d\mu(v) \quad (17)$$

$$dP(g) = \sum_i \kappa_g(g - \hat{g}_i) d\mu(g)$$

where κ are suitable kernels (Parzen windows). If the problem cannot be solved uniquely, for example because there are entire subsets of the solution space where the cost is constant, this does not matter as any solution along this manifold will be valid, accompanied by a suitable prior that is uninformative along it. When this happens, it is important to be able to "align" all solutions so that they are equivalent with respect to the traversal of this unobservable manifold of the solution space. This can be done by joint alignment as known to those of ordinary skill in the art.

When the class is represented not by a single template $\xi$, but by a distribution of templates, as in category recognition, the problem above can be generalized in a straightforward manner, yielding a solution $\hat{\xi}_i$ at each capture session, from which a class-conditional mixture distribution can be constructed using, again, a Parzen window or other general density estimator:

$$dQ_c(\xi) = \sum_{i=1}^{M} \kappa_\xi(\xi - \xi_i) d\mu(\xi). \quad (18)$$

An alternative to approximating the density $Q_c(\xi)$ consists of keeping the entire set of samples $\{\hat{\xi}\}$, or grouping the set of samples into a few statistics, such as the modes of the distribution $dQ_c$, for example computed using Vector Quantization, which is the choice adopted in the described preferred implementation.

In the implementation and experiments section below, objects are learned individually, but a label is assigned by the user by drag-and-drop into icons of previously learned objects. Different objects grouped under the same label are samples of the same object category. In the meantime, some "slack" in the present object model allows recognizing somewhat different objects as one class. This enables the creation of "functional categories of objects" where the information that groups different objects under the same label is provided by the user, that can for example group objects by their function (e.g. chairs, as something one can sit on) rather than by visual similarity.

2.10 Recognition

Once training has been performed, recognition in a single video frame is performed in a variety of manners, some described in the next section. The presence of multiple views is not strictly necessary in this recognition phase, as visual decisions (detection, localization, recognition, categorization) can be performed on a single datum, as previously discussed. However, multiple views can be used profitably to improve the classification performance, for example by treating the result on each frame as a weak classifier in a boosting framework. In the next section we describe the details of an end-to-end implementation on a mobile device.

3. Implementation and Experiments

The recognition system of the present invention as described above was implemented and its performance tested in terms of accuracy and computational efficiency. The integration of the Tracking on the Selection Tree (TST) and the Best Template descriptors (BTD) enables running in real-time on a mobile device such as an iPhone, while still providing comparable or better recognition accuracy than traditional algorithms running on desktop computers or computing servers.

This recognition system has been implemented on an iPhone 3GS with a 600 MHz ARM chip CPU. The workflow was previously summarized in FIG. 2 and is discussed in more detail in the following subsections. Each image for this implementation is considered to be captured sequentially with a refresh rate of 15 frames-per-second (FPS) in 320×240 pixels resolution.

3.1 Feature Detection and Tracking

By way of example, and not of limitation, to determine the correspondence of (canonical reference) frames $\hat{g}_{ij}(t)$ as described previously, for each scale $\sigma_j$, $j=0, \ldots, 4$, limited by computational resources, independent detection of $x_i(t)$ is performed as in an earlier section using FAST corner detection with size and threshold parameters 9 and 20 respectively, with non-maximal suppression to guarantee proper (spatial) sampling as previously described. The rotational reference $R_{ij}$ can be fixed by gravity as also previously described. Each feature $\hat{g}_{ij} \doteq \{x_i, \sigma_j, R_{ij}\}$ is scored in decreasing order of structural stability from Definition 4, by measuring the scale-normalized distance to the nearest detected feature. Alternate scoring mechanisms can also be devised, or feature detection can by foregone altogether in alternate embodiments, without detracting from the teachings of the present invention. Correspondence is established for the translational component $x_i(t+1)$ through a simple (differential) translational tracking algorithm that, starting from the locations selected at the coarsest scale $j=4$, provides $v_{i4}(t)$ such that $\hat{x}_i(t+1) \doteq x_i(t) + v_{i4}(t)$ for all $x_i(t)$ selected at scale $j=4$. The new image is then back-warped by $-2v_{i4}(t)$ in each region $B_{\sigma_3}$ $(x-x_i(t+1))$, described in Eq. (14). There, points $x_i(t+1)$ are reselected within the back-warped region, and the procedure repeated as already described.

If a topological change occurs at level j (i.e., if the selection mechanism returns none, or more than one isolated extrema at the current scale), the motion $v_{ij}$ is not propagated to level $j-1$, and is instead reported as a motion estimate for $x_i$ with native scale $\sigma_j$. From level $j-1$ onward, the (multiple, or none) features $x_i$ that fall within $B_{\sigma_{j+1}}$ $(x-x_i(t+1))$ are used to propagate velocity estimates down until $j=0$, as illustrated in FIG. 3A through FIG. 3D.

In order to keep the number of tracked features between 40 and 50, rather than only reporting motion at the finest scale $v_{i0}$, motion is reported at all scales, $v_{ij}$, each with its own scale $\sigma_j$, as illustrated in FIG. 3B.

Figure 4B:
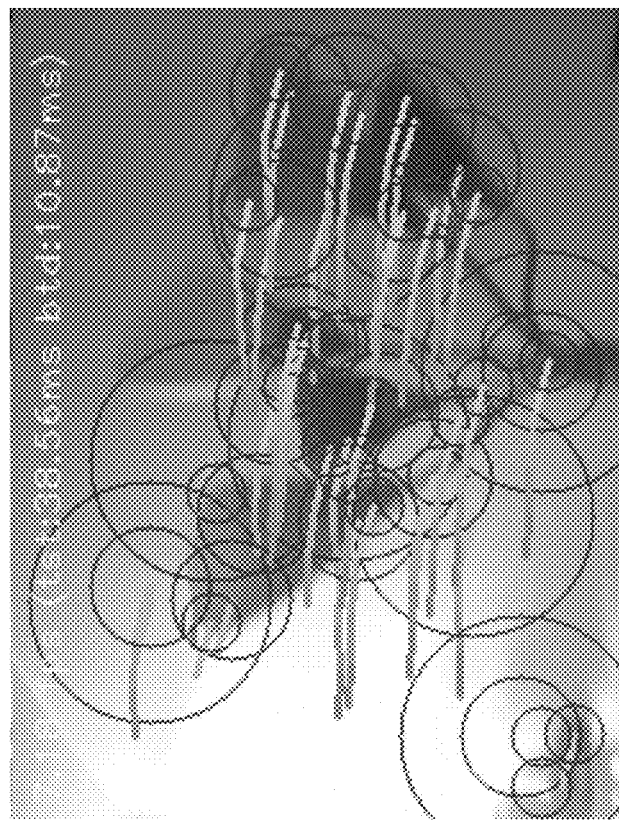
FIG. 4A and FIG. 4B are images illustrating feature tracking with trails indicating feature trajectories according to an embodiment of the present invention.

This approach differs from traditional multi-scale feature detection and tracking as described in previous sections. It enables tracking over relatively large baselines as shown empirically in FIG. 3A through FIG. 3D, and improves accuracy and (structural) stability, as defined in Definition 4 and quantified by the number of inlier matches. A quantitative experiment on real sequences is reported in a later section with snapshots of tracking features on a mobile phone being shown in FIG. 4A and FIG. 4B.

The elongate trails seen in the images depict corners selected at multiple scales and tracked on a mobile phone as moving the camera downward, and to the right, while the circles represent the scales of the features. These are shown by way of example and not limitation in response to largely vertical device movement in FIG. 3A and horizontal movement in FIG. 3B.

The coarsest scale in this preferred embodiment is a 30×40 image, where a one-pixel displacement corresponds to 16 pixels at the finest scale, which guarantees the proper sampling condition in the majority of cases. Inter-frame motions larger than 16 pixels are usually accompanied by warping (due to the progressive scan capture) and motion blur, which causes the tracker to fail anyway.

Figure 4A:
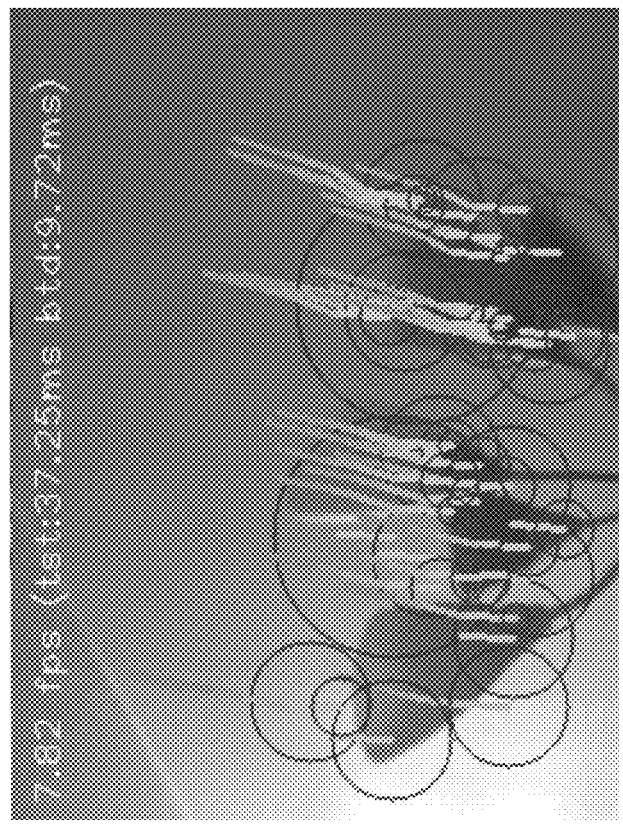

In FIG. 4A a snapshot is seen on feature tracking with the elongate tracks shown overlying the image. The feature tracking together with capturing video runs at around 10 frames per second, depending on the number of features. When the number of features drops below 40, the new video frame is slated for a new selection so as to maintain the number of features as close to 50 as possible, and as close to uniformly distributed on the image plane as possible.

A full geometric validation, or a coarser hypothesis test for constant configuration of selected features, can be used for an outlier rejection step. Given a tracked feature, if its neighboring features in the previous frame are tracked as its neighbors in the current frame again with more than a 0.5 threshold ratio, then it is classified herein as an inlier, and otherwise it is rejected as a (partial) occlusion. Feature tracking results are then used to limit the search space for feature detection in the new image. This is in line with the diffeomorphic domain deformation model.

3.2 Feature Descriptors

Once local frames $\hat{g}_{ij}$ are available, descriptors are computed around each one following the guidelines described in a previous section. For each selected and tracked region, a gradient orientation is computed. The image pyramid available from feature detection and tracking is used for this purpose. In the present implementation the descriptor is continuously updated as long as its frames are being tracked.

Figure 5:
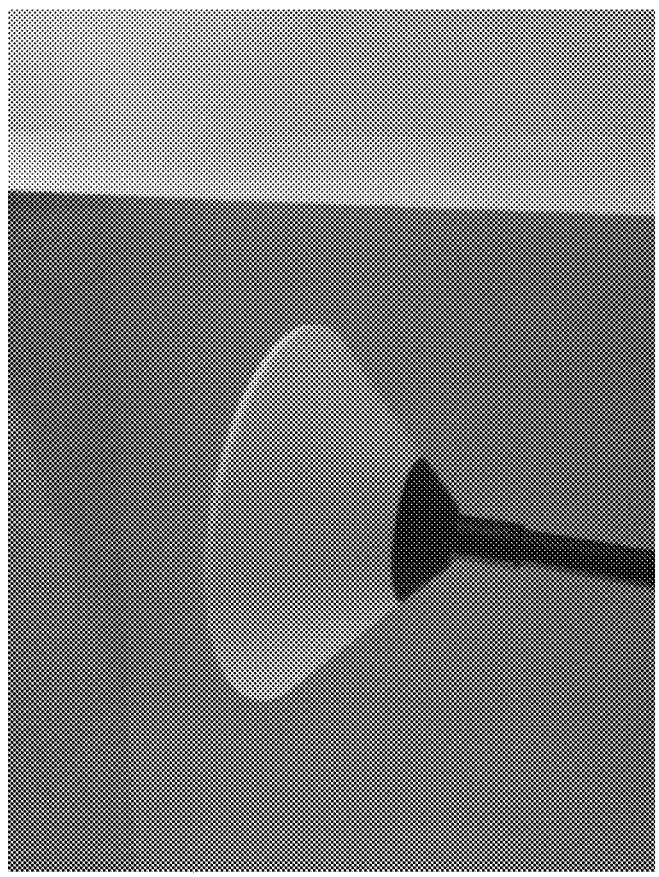
FIG. 5 depicts a target object (conical lamp shade) for which detection of multi-scale features is demonstrated.

FIG. 5 depicts a target object (conical lamp shade) for which detection of multi-scale features are demonstrated.

Figure 6:
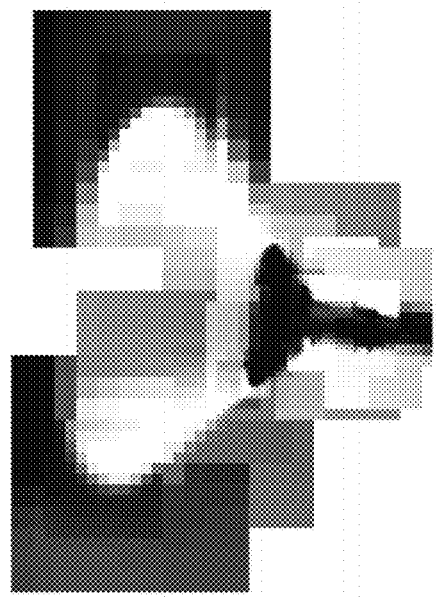
FIG. 6 is an image illustrating a best-template descriptor based on the learning model object shown in FIG. 5 according to an embodiment of the present invention.

FIG. 6 illustrates an image of best-template descriptors (BTD) determined for the conical lamp shade of FIG. 5. It should be noted that the descriptor is visualized via a contrast-normalized intensity patch, as an equivalent representation, to first-order, of a contrast invariant, for easier visualization compared to the gradient orientation. It should also be noted that the preferred embodiment(s) of the invention use a contrast invariant in the form of gradient orientation or maximum of gradient orientation histogram, whereas the figure illustrates normalized gray-level.

In each case, the descriptors can be quantized for the purpose of dimensionality reduction, for example using a vocabulary tree via hierarchical K-means, although alternate vector-quantization schemes can be employed. The vocabulary tree is built by way of example and not limitation with 4 levels and 8 clusters each, forming 4096 clusters with centers in the leaf nodes. Thus each descriptor can be represented as a short integer.

3.3 Recognition in a Single Video Frame

Once a template is learned from multiple video frames, recognition is possible from a single image, or from multiple frames if available. A multitude of classification schemes can be employed for this test, depending on the computational constraints of the computing device available. The simplest one consists of discarding all spatial arrangements corresponding to a so-called bag-of-features model of features $\phi_{ij}$ described in Eq. (14), compatible with an arbitrary viewpoint change for objects of general shape as previously described. The quantized descriptors are used for learning object models, and also for recognizing the objects in a video frame. In alternative embodiments one can consider spatial relations for example using a proximity distribution kernel, that can be naturally fit into a large-margin classification framework. By way of example, and not of limitation, in the simplest embodiment for scoring a set of features with respect to a certain object, a term frequency-inverse document frequency (TF-IDF) scheme can be utilized. Other classifiers known to those skilled in the art can also be used, including, but not limited to, nearest neighbors, support-vector machines, random forests, etc.

In this example, TF-IDF score of a feature $\phi_{ij}$ for an object d is defined as $$tf(\phi_{ij}, d) = \frac{n(\phi_{ij}, d)}{\sum_{ij} n(\phi_{ij}, d)} \quad (19)$$

$$idf(\phi_{ij}) = \log \frac{|D|}{|\{d: \phi_{ij} \in d\}|}$$

$$(tf\ idf)(\phi_{ij}, d) = tf(\phi_{ij}, d) \times idf(\phi_{ij})$$

where $tf(\phi_{ij},d)$ is the term frequency defined as the ratio of $n(\phi_{ij},d)$, the number of feature $\phi_{ij}$ in object d, over the total number of features in object d. The inverse document frequency $idf(\phi_{ij})$ is defined as the log-scale ratio of |D|, the total number of objects, over the number of objects that include feature $\phi_{ij}$. The TF-IDF score is then computed by multiplying this term frequency and the inverse document frequency, modified by substituting #($\phi_{ij}$,d), the number of features $\phi_{ij}$ corresponding to an object, with either 1 or 0, depending on whether the corresponding feature is present or not. This way, a user can take multiple views of an object effectively while learning the model of the object without producing skewed sampling of features from different views. To recognize an object, the TF-IDF score of the set of features is computed and compared against all the learned object models, and the object with the highest score is chosen.

While multiple video frames are indispensable in training they are not strictly necessary for testing, although they can be beneficial. In the present implementation independent classification for each test image is performed. However, one could treat each image as a weak classifier in a cascade-of-classifier framework.

While this choice of classifier was motivated by the severe resource constraints imposed by today's mobile devices, as the computational processing power grows on these platforms, more sophisticated classifiers can be implemented. In alternate preferred embodiments that are currently implemented on laptop-grade computers, the implementation can utilize support-vector machines and other large-margin classifiers, or alternatively random forest and other boosting classifiers, or convolutional neural networks and other network-based classifiers.

3.4 User Interface

Figure 12:
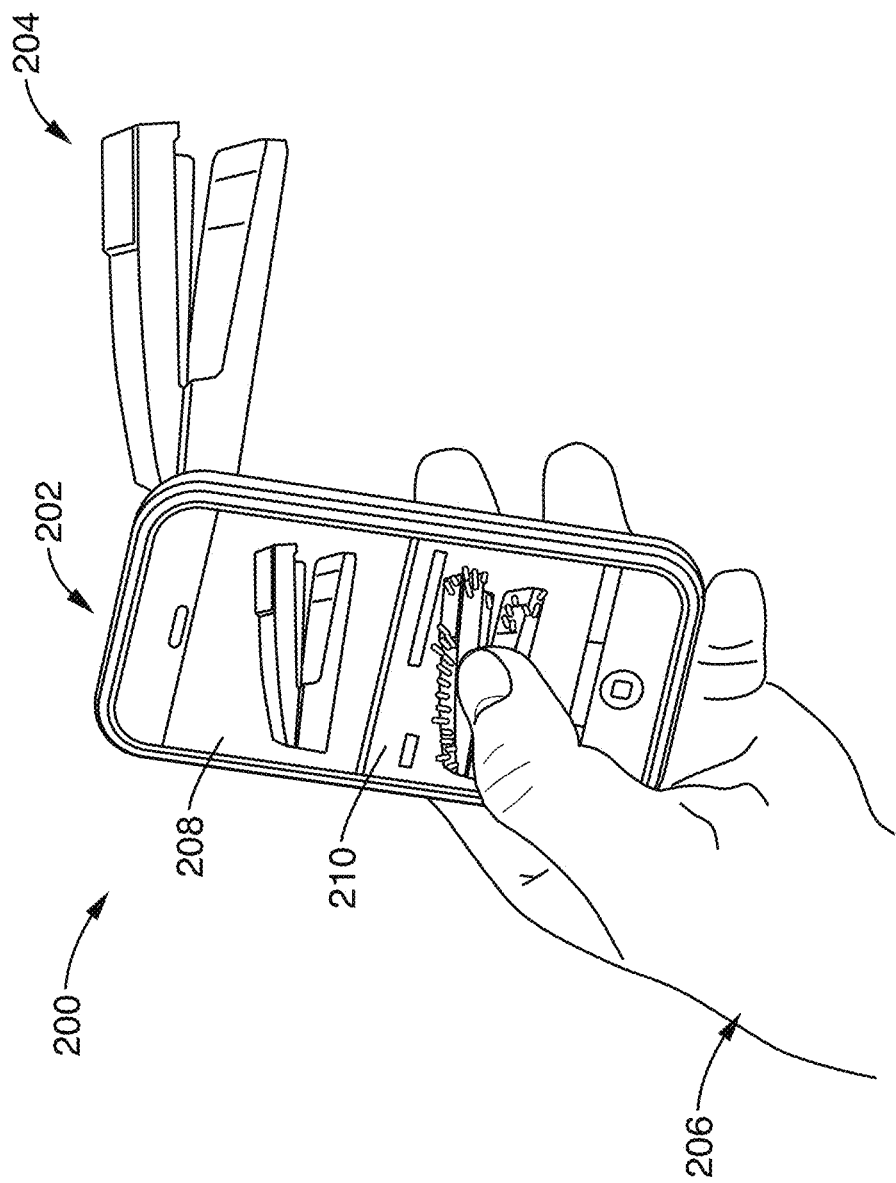
FIG. 12 illustrates visual learning and recognition on a handheld device according to an embodiment of the present invention.
Figure 13:
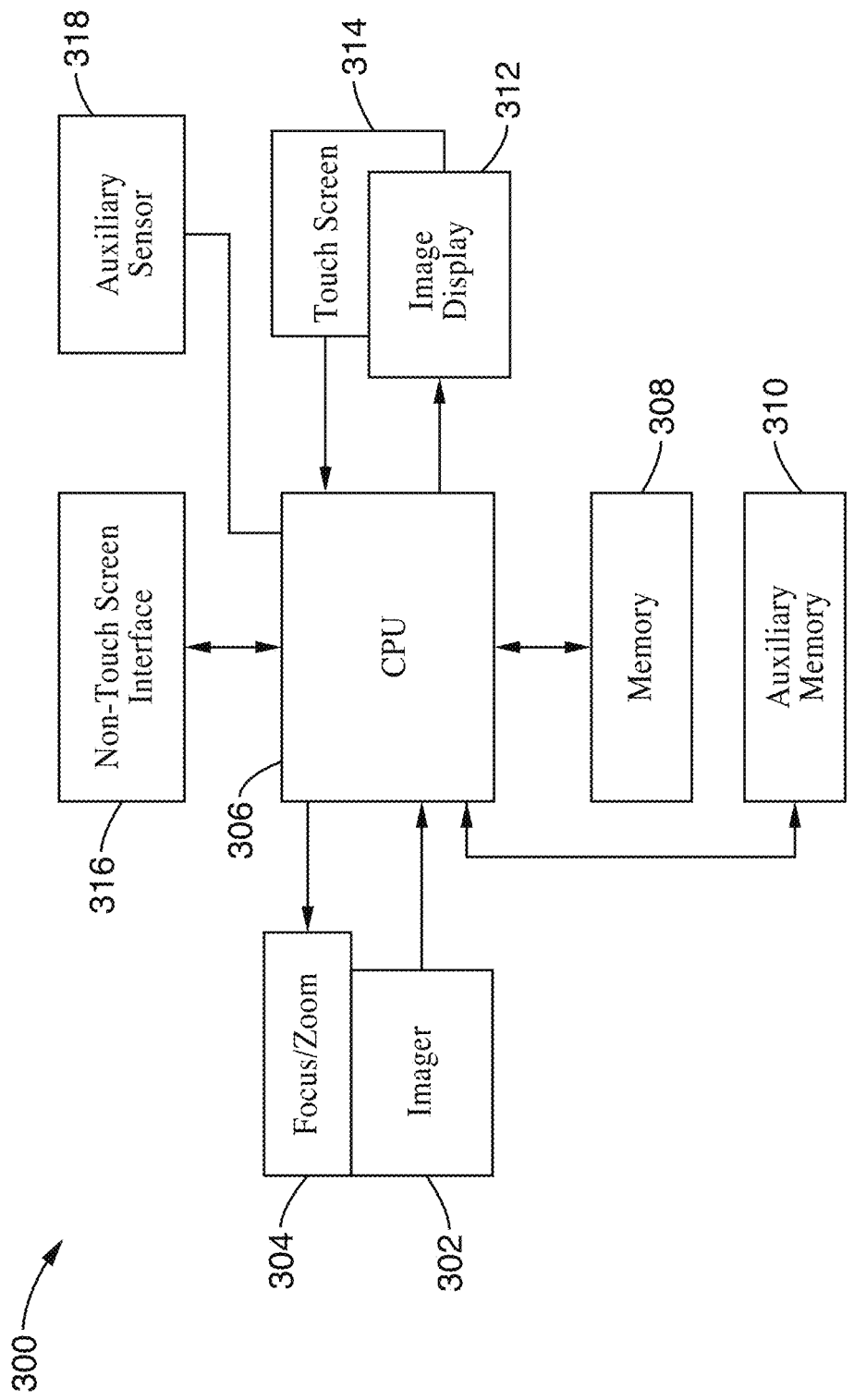
FIG. 13 is a block diagram of a hand-held device according to an embodiment of the present invention.

A user can, for example, press the screen to learn an object model (e.g., see FIGS. 12 and 13 and associated discussion). For any given object, multi-scale features are detected and the best-template descriptors are computed.

Figure 7B:
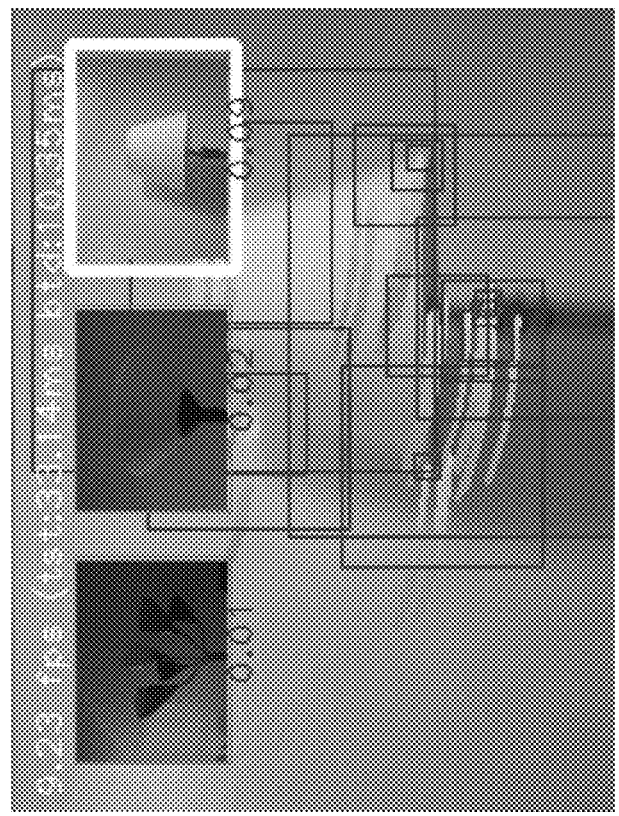
FIG. 7A and FIG. 7B are images showing recognized objects displayed according to an embodiment of the present invention.
Figure 7A:
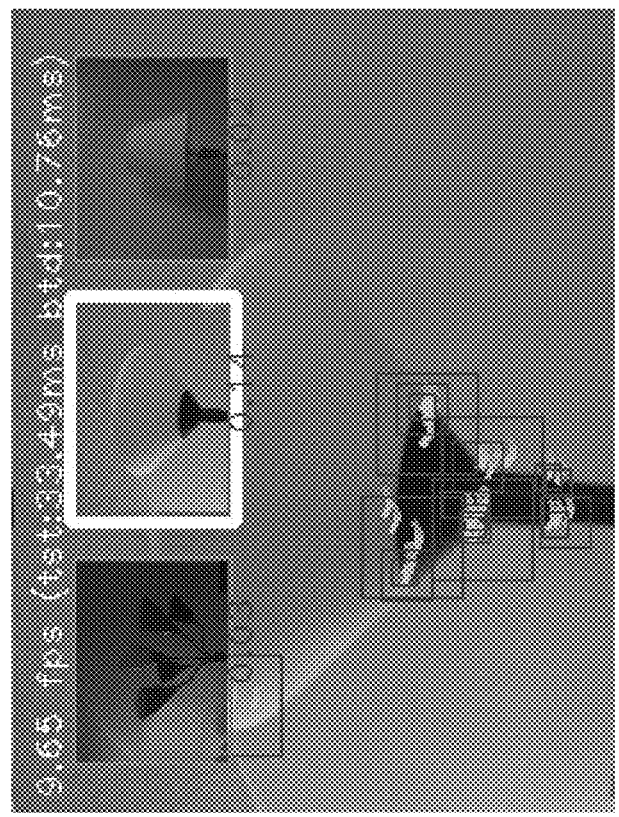

Referring to FIG. 7A and FIG. 7B the recognition of objects on a mobile phone is shown. The highlight squares in the main image depict the subset selected to instantiate a descriptor, while recognized objects matching this descriptor are shown as highlighted thumbnails inset at the top of each image. Alternate embodiments can use all descriptors in the video frame where the user taps on the screen to build the representation, or can restrict the descriptors to those closest to the location where the user taps, or use other mechanism to restrict the representation to a subset of the descriptors that are selected.

During the training phase, a user is allowed to move the device freely, and click or tap on the screen to capture an object. As the user moves the object or the device around, features are being selected, tracked, and descriptors are being stored. The current system relies on the user to sufficiently explore an object during training. In an alternate embodiment, a robotic device can be employed to that end.

Because scale is a semi-group, with the most informative scale being the native scale of the sensor, learning is typically best performed by looking at the object from a short distance. However, as already discussed the entire semi-group of scales can be sampled in post-processing, and descriptors generated from multiple scales that will later enable recognition of an object from a distance greater than the one used for learning and not represented in the training set. More importantly, this enables recognition by computing descriptors at a single scale, which can be performed in real-time despite severe resources limitations.

During testing, as the user moves the device, again features are being selected and tracked, and descriptors computed. To expedite processing, the gradient image is computed only around selected features. After the descriptors are quantized using a vocabulary tree, the TF-IDF or other scoring scheme is used for recognizing objects.

3.5 Performance Measurements

Figure 8A:
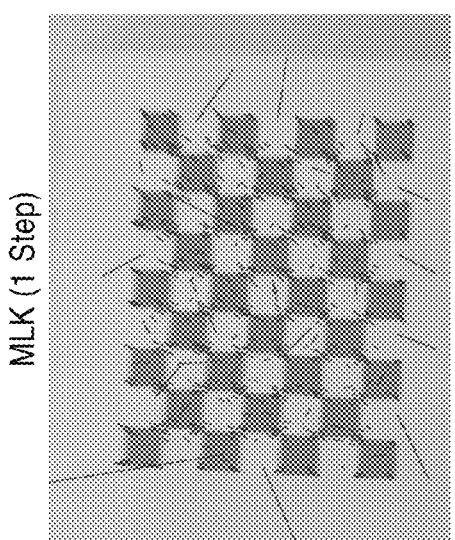
FIG. 8A through FIG. 8F are tracking plots comparing multi-scale Lucas-Kanade (MLK) tracking and Tracking on a Selection Tree (TST) methods according to an embodiment of the present invention.
Figure 8B:
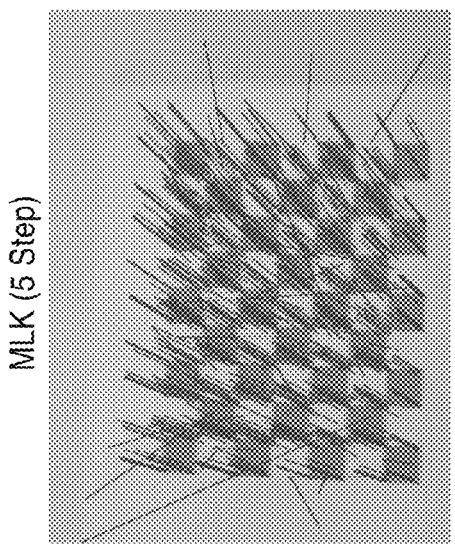
Figure 8C:
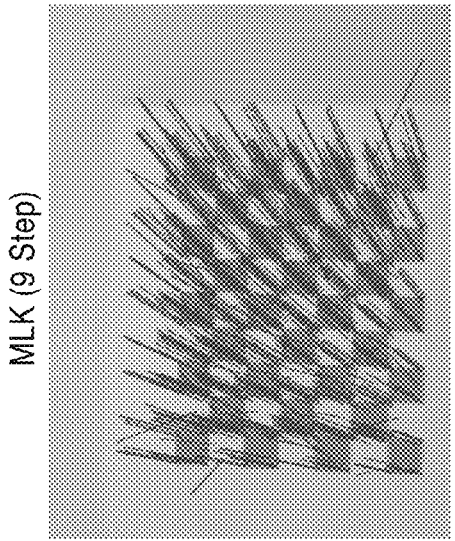
Figure 8D:
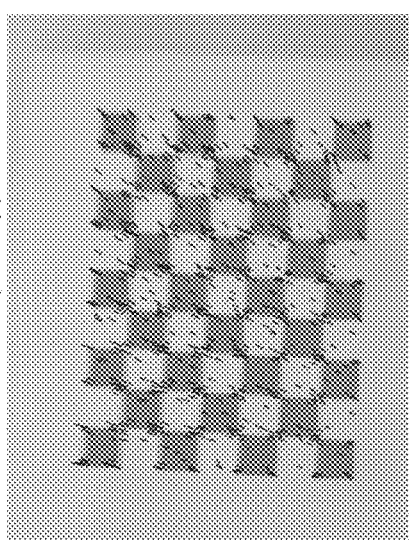
Figure 8E:
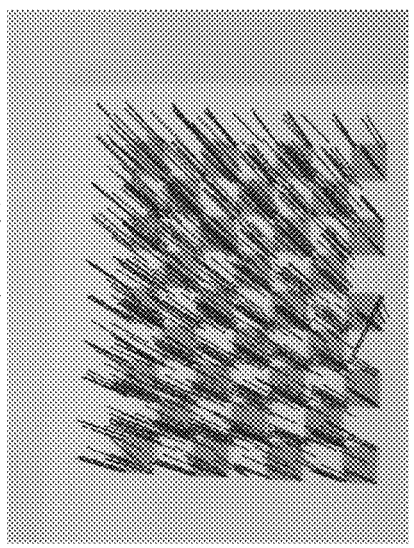
Figure 8F:
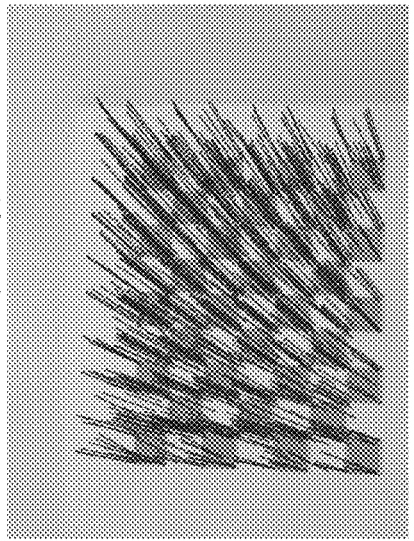

As an example of performance enhancement achieved by the present invention, FIG. 8A through FIG. 8F provide a qualitative comparison between TST and MLK tracking approaches shown with increasing steps of parallax. FIG. 8A through FIG. 8C illustrate MLK tracking with 1, 5 and 9 steps of parallax, respectively. Similarly, FIG. 8D through FIG. 8F illustrate TST tracking according to an embodiment of the invention with 1, 5 and 9 steps of parallax, respectively. The plots shown are 2D tracking plots between two video frames (feature tracks overlayed on one frame). The arrows show the displacement of a given corner from one image to the next. These figures show the qualitative comparison between MLK and TST, and that TST tracks are cleaner than MLK tracks.

Figure 9:
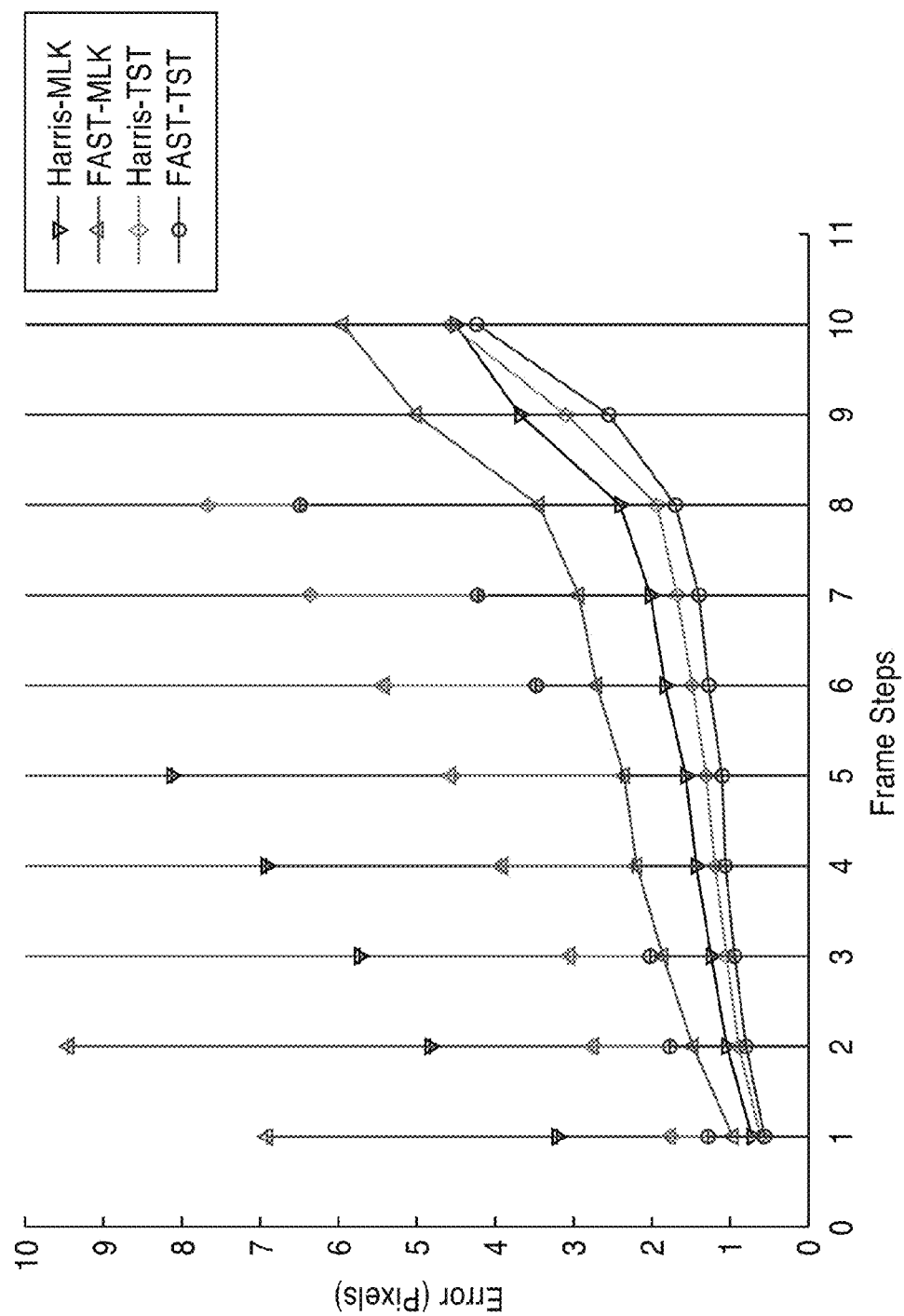
FIG. 9 is a graph of tracking error for the Lucas-Kanade (MLK) and Tracking on a Selection Tree (TST) methods shown in FIG. 8A through FIG. 8F according to an embodiment of the present invention.
Figure 10:
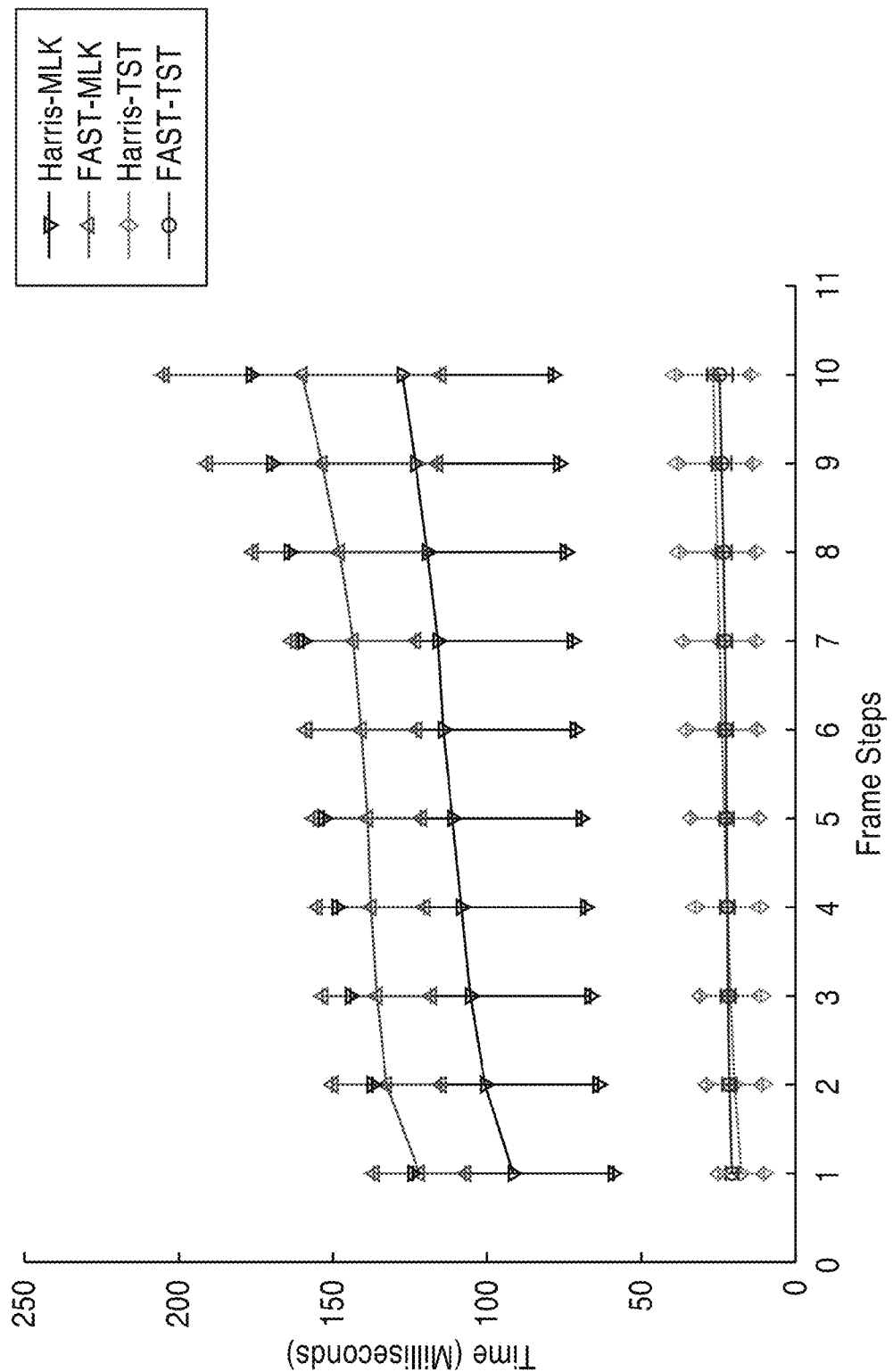
FIG. 10 is a graph of computation time for the Lucas-Kanade (MLK) and Tracking on a Selection Tree (TST) methods shown in FIG. 8A through FIG. 8F according to an embodiment of the present invention.

FIG. 9 and FIG. 10 provide a quantitative comparison between the TST and MLK tracking approaches, shown utilizing both Harris corners and FAST corners. FIG. 9 depicts tracking errors for these combinations of methods, in which it can be seen that the higher two error plots are those representing the MLK approach while the TST approach is seen to how less pixel error. In FIG. 10 execution time for the approaches is depicted, whereby the MLK approach is seen to require far longer execution times than that of the TST approach of the present invention.

Table 2 provides a tabular comparison of multi-scale translational tracking and tracking on the selection tree. Measured tracking error for these combinations of methods are shown along with computation times. It will be readily seen from this table that FAST-TST according to the present invention performed best in both accuracy and speed as seen by the bold numbers indicating best results for each test.

Table 3 provides runtime computations of TST-BTD and MLK-SIFT with the time necessary to perform tracking, and to determine descriptors. An overall processing speed is also indicated in frames per second (fps). It is noted that the TST-BTD according to the invention performed these operations in significantly less time than required by conventional MLK-SIFT methods.

Figure 11A:
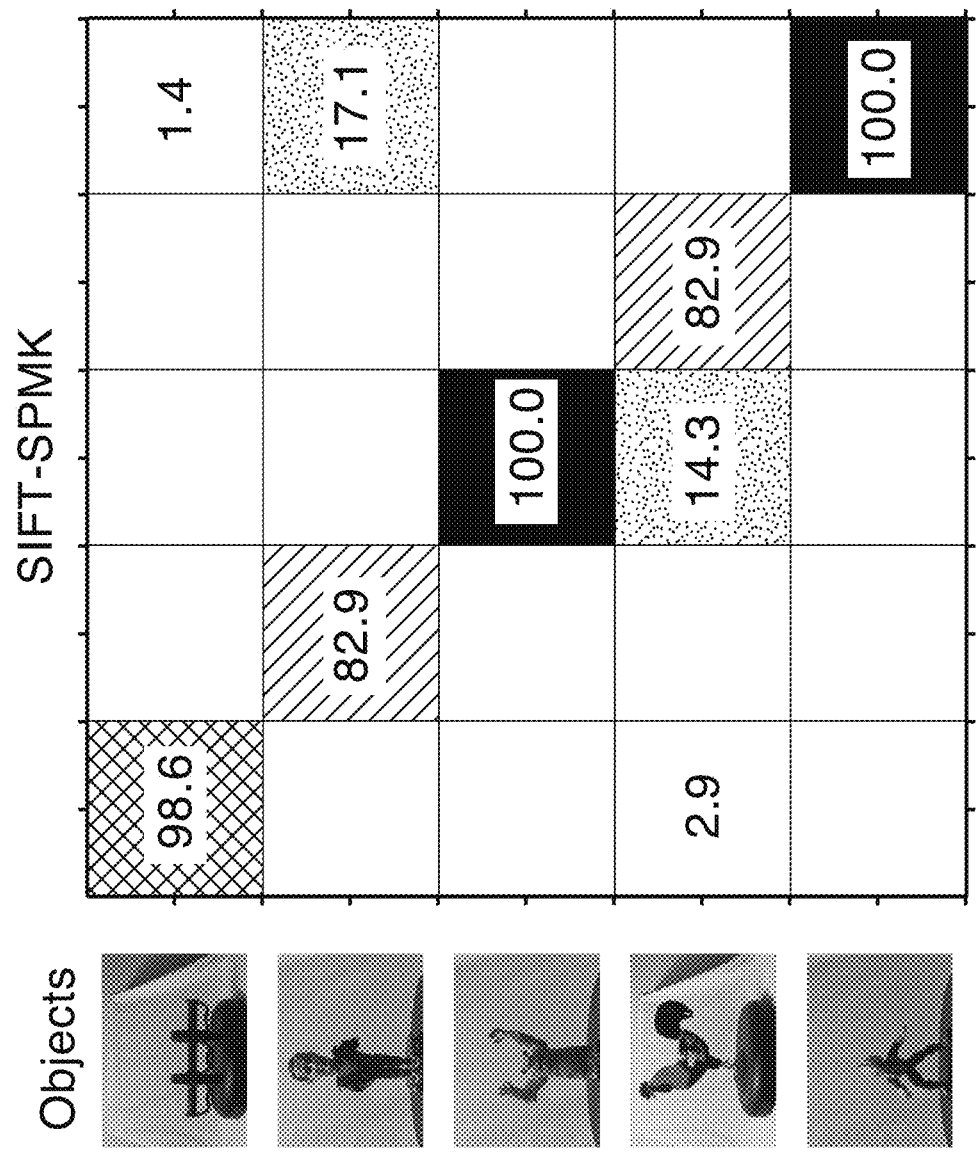
FIG. 11A through FIG. 11C are confusion matrices of using Scale-Invariant Feature Transform (SIFT), and using Best Template Descriptor (BTD) according to an embodiment of the present invention.
Figure 11B:
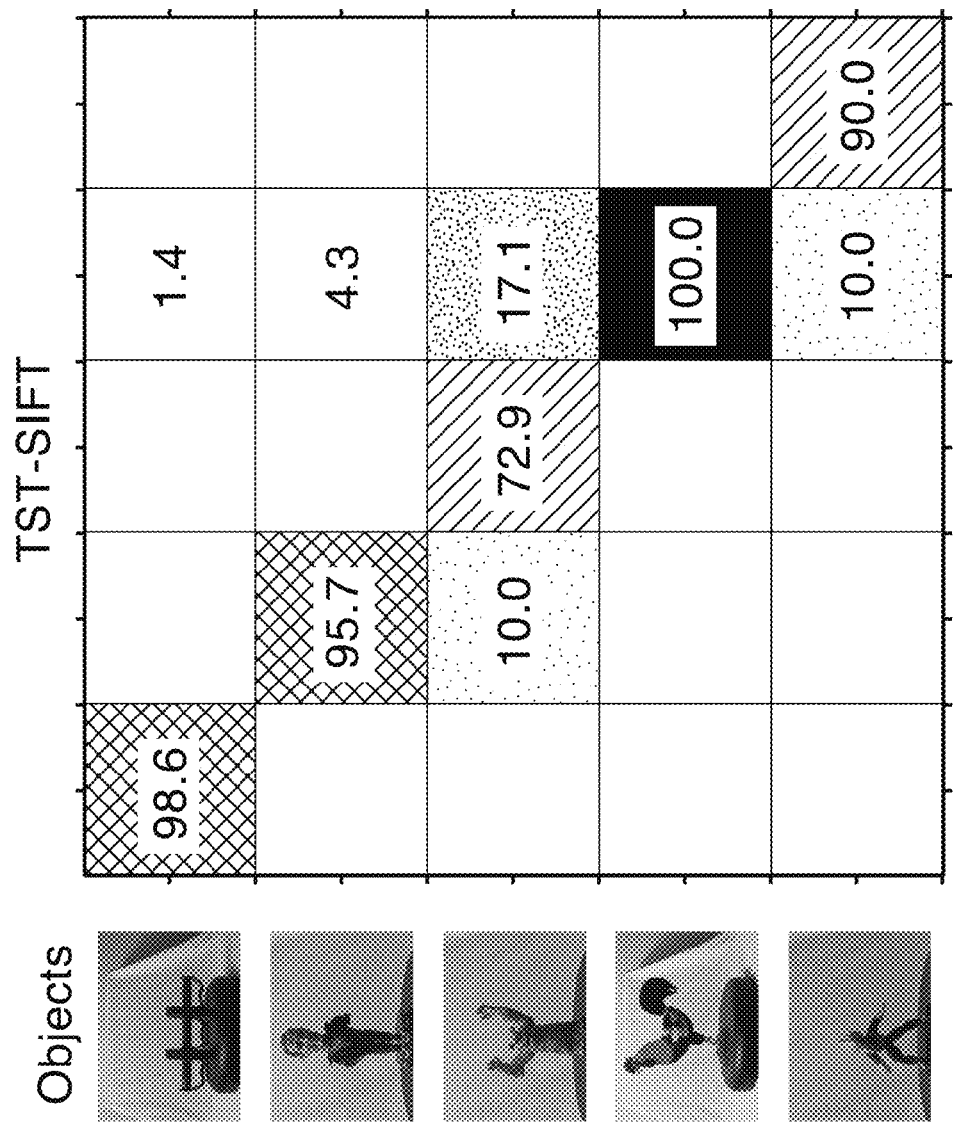
Figure 11C:
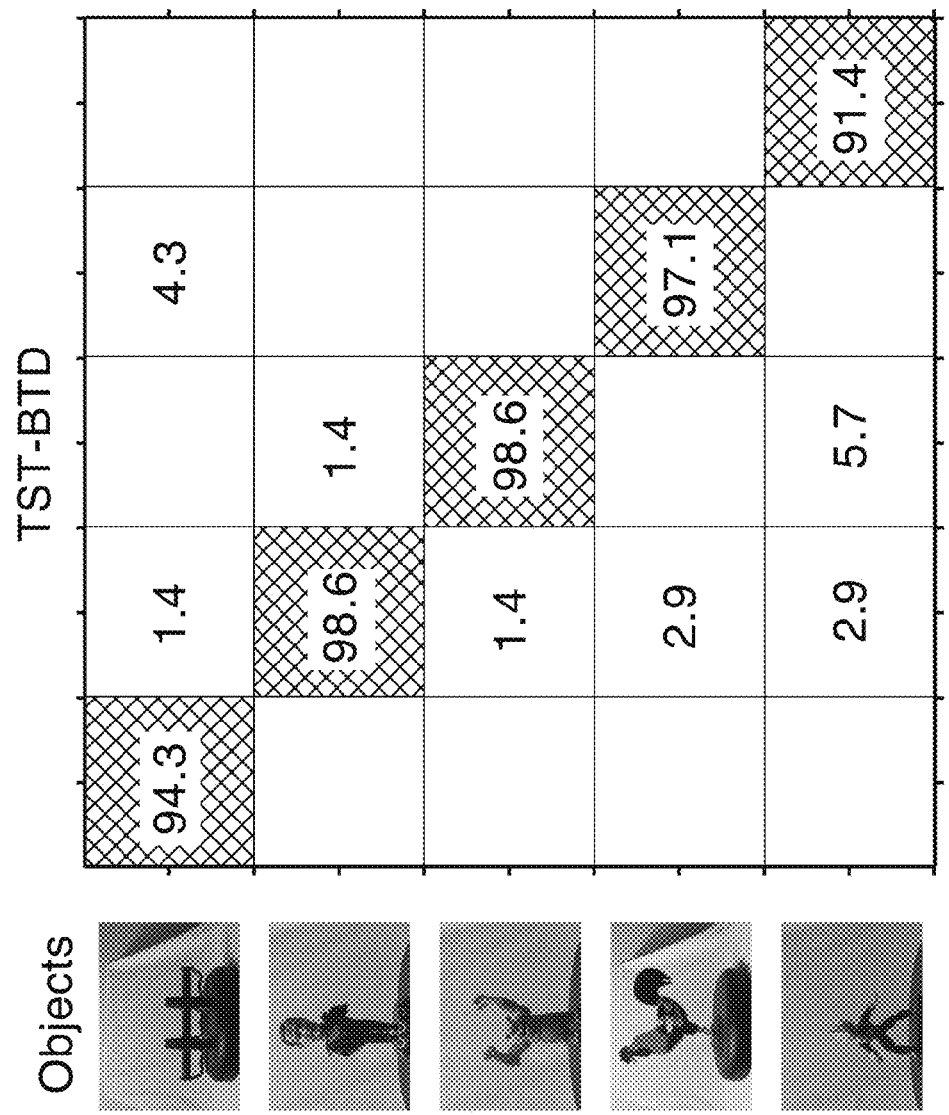

FIG. 11A through FIG. 11C illustrate example confusion matrices comparing SIFT and best-template descriptors. In these confusion matrices, the rows are testing objects and the columns are recognition results. The numbers at diagonal elements are successful recognition ratio, while off-diagonal elements are error ratio. Representative sample images of the objects are shown to the left in each of the figures. These confusion matrices are generated using SIFT and BTD, by training objects at one scale and testing for different viewing angles and scales. Performance is similar, with some trials favoring SIFT, while others favor BTD, depending on the training sequences. However, it will be appreciated that BTD is significantly faster to compute, as shown in Table 3.

The performance of the inventive system, tested off-line, is qualitatively comparable with algorithms performing at baseline levels on standard datasets such as the "Caltech 101" dataset but operating on desktop computing platform. However, direct comparison is not straightforward because multiple (supervised) hand-labeled training samples are not used for each category, but instead multiple images are used of the same object, relying on the user to sample multiple aspects (viewpoints). Instead, a baseline algorithm was tested on a Moreels dataset with multiple view images of object instances; and a stock implementation of SIFT bag-of-features with spatial pyramid match kernel (SIFT-SPMK) was taken from the VLFeat library that performs at 65% on the "Caltech 101" dataset, and tested it on Moreels data where it scored 92.8% correct. Based on FIG. 5 and FIG. 6, the TST-BTD approach of the present invention performs better (TST-BTD 96.0%, TST-SIFT 91.4%), even with far less computational complexity. The experiments are explained below.

First, TST tracking is compared with standard multi-scale Harris corner selection with multi-scale Lucas-Kanade tracker, as implemented in the OpenCV, which is referred to herein as MLK. Representative experiments are illustrated in FIG. 3A through FIG. 3C, and quantitative experiments are reported in Table 2 and Table 3. It can be seen therein that the present approach is faster for an equal number of tracked features, more accurate (a smaller median motion error), and considerably more robust (a smaller spread between the mean and the median). It should be noted that the important figure is not the mean, but the spread between the mean and the median, because that is related to structural stability. The median and the mean alone, provide information on BIBO stability that is irrelevant for recognition (unless, of course, tracking errors cause the descriptor to pick up nearby regions that are irrelevant). With this, the overall recognition that involves capturing images, detecting and tracking features, and calculating descriptors is performed at a rate of about 7 frames-per-second on an iPhone 3Gs.

FIG. 11A through FIG. 11C provide a comparison of TST with SIFT using a set of objects that have multiple viewpoints and scales. Representative quantitative experiments are reported in FIG. 11A through FIG. 11C where it can be seen that SIFT and BTD perform similarly in terms of accuracy, but SIFT is significantly more costly to compute, as can be seen from Table 3 which depicts runtime computation times as tested on an iPhone.

4. Hand-Held Device Implementation

Refer now to FIG. 12 and FIG. 13. FIG. 12 illustrates an example embodiment 200 of a handheld device 202 configured with computer processing (see FIG. 13), memory, and programming for performing visual recognition according to the invention. In this figure a common stapler 204 is shown as the subject of visual recognition, however, it should be appreciated that the present invention is generally applicable for performing visual recognition on any device or object without limitation. A user 206 is shown operating handheld device 202. The handheld device is configured with a screen, shown in this image depicting two portions, a first portion 208 showing video image capture, and a second portion 210 depicting graphical information generated by the present invention based on the first portion. In this regard, it should be noted that in the picture, we presented an example where we divided the screen in two portions. However, the invention is not limited to that configuration. For example, we can overlay recognition and processing result on top of the video image in one full screen.

FIG. 13 illustrates an embodiment 300 of the processor/peripheral interface of the hand-held electronic device 200 having image capture capability, such as found within cellular phones, personal digital assistants, netbooks, cameras, video cameras, or other electronic devices or combinations thereof. An imager 302 is shown which can be controlled by optics 304, such as focusing and zoom controls and other optional imaging elements as desired. It will be noted that many small portable devices, such as cellular phones, have only a fixed focal length without zoom capability. Image data according to the present invention is processed by a CPU or controller 306 having memory 308 and optionally auxiliary memory 310 (e.g., memory stick), within which content can be stored and from which programming can be executed for performing the inventive elements described herein. A display screen 312 is shown upon which the captured material (video and/or images) can be displayed, as well as performing training and recognition according to the invention. Coupled to display screen 312 is an optional touch screen 314 which registers user touch in response to the display of images as well as in response to overlaying menus and other control input selections. The hand-held device apparatus 200 is also alternatively/additionally shown with a non-touch screen interface 316 representing user input and output (I/O) which is not associated with the touch screen.

An auxiliary sensor module 318 is shown coupled to the hand-held device, that can include one or more sensors such as an acceleration sensor (preferably a three-axis acceleration sensor), global positioning system (GPS) receiver (e.g., position sensor), gyrometer (rotation sensor), etc. It should be appreciated that the hand-held device may contain additional elements, beyond those shown in FIG. 13, without departing from the present invention, such as audio outputs, audio inputs (microphone), global positioning system (GPS), various (wired and wireless) communication mechanisms, and so forth which can be utilized in conjunction with the present invention as desired.

It will be appreciated that elements of the present invention are implemented for execution within hand-held apparatus 200, such as in response to programming resident in memory 308 which is executable on CPU 306. In addition, it will be appreciated that elements of the present invention can be implemented as programming stored on a media, wherein said media can be accessed for execution by CPU 306.

5. Observations and Conclusions

A recognition system with integrated feature tracking and object recognition has been described according to the present invention, along with an analysis that motivates the design choices in light of attempting to minimize run-time cost of the algorithm. The analysis allows one to reach a number of conclusions that are relevant for the design choices that a resource-constrained platform imposes. The need to integrate correspondence, or tracking, into recognition forces us to implement an efficient feature selection and tracking mechanism. Guided by the notion of (Morse) isolation and proper spatio-temporal sampling, a modified (similarity)-frame detection and tracking algorithm, TST, has been demonstrated which is less resource intensive (cheaper) and provides improved results (better) than prior approaches. The best-template descriptor, BTD, is designed to be optimal among template descriptors, and outperforms other algorithms as shown in the experiments.

The BTD assumes that the object is (at least locally) rigid, and domain deformation is due to changes of viewpoint. Thus it is not suited for complex articulated objects such as humans. In that case, the blurred template will lose discriminative power. Instead, one would need to independently track and describe rigid parts, and group them as a coherent entity in post-processing. In an alternate embodiment, one can consider template descriptors subject to temporal variability, where the co-variant frames are defined relative to the diffeomorphic group, and therefore the tracking process provides the object-specific deformation that can be used to recognize "actions" independent of the actor (nuisance), or the actor (template) independent of the action.

For example, in the presence of a deforming scene, the temporal distribution of gradient orientation in the BTD will encode object-specific variability due to shape, as well as due to characteristic deformations. In the presence of small deformations, the BTD as described can capture the object-specific variability without undue loss of discriminative power. When deformations are substantially larger, however, one can easily augment the gradient direction (or other contrast-invariant statistic) in the BTD with a deformation-covariant statistic, that is approximated by the optical flow. The resulting augmented statistic (gradient orientation and deformation field) can then be used to computed the BTD. The same considerations regarding the choice of statistic (mean, median, mode, or the entire histogram) apply to the augmented statistic. The resulting descriptor can be used for recognizing temporal variability due for example to typical actions or events. In this case, gradient orientation encodes object-specific appearance, whereas optical flow encodes object-specific deformation. The latter is not necessary when the object or scene is static, as we have assumed so far, but the extension is straightforward and within the general methodology taught in this invention. One of ordinary skill in the art will recognize that several variants of this procedure can be employed, for example when the two channels (contrast-invariant, i.e., gradient direction, and deformation co-variant, i.e., optical flow) are given unequal weight, so the BTD can be composed from their joint histogram, from their marginal histograms, or from various combinations of the two. In particular, one can consider temporal distribution of spatial aggregations (histograms) of contrast-invariant statistics (gradient orientation) and optical flow. One can also retain the temporal ordering of the samples, for that can be relevant to the classification of actions beyond the collection of poses that compose the distribution. In any case, all further considerations, including dimensionality reduction using vocabulary trees or other means, apply.

The present inventive methods integrate several components of a visual recognition system in a manner that reduces computational complexity while maintaining performance (expected probability of error, a.k.a. risk) unchanged. Specifically, multi-scale detection and tracking of low-level features ("corners" in the simplest case of translation nuisances) is done in a way that preserves the group-structure of planar translations (by employing translation-covariant detectors) and preserves the semi-group structure of scale and quantization (by sampling scales via a Gaussian pyramid and computing co-variant detectors at each scale). This is different from most existing co-variant detectors in that it does not involve joint location-scale optimization (e.g., Lindeberg: principles of automatic scale selection), but explicitly accounts for topological changes across scales. This approach (which we refer to as "Tracking on the Selection Tree", or TST) respects the semi-group structure of scaling/quantization, and is motivated by the "structural stability" of the selection process. This improves both accuracy and robustness while increasing tracking efficiency.

The traditional single-view descriptors are replaced with our inventive "template descriptor" that is designed to be optimal in the mean-square sense, relative to nearest-neighbor classifier rules, that we refer to as a "Best Template Descriptor" (BTD). Unlike approaches that simulate nuisance variability in the training set from a single image, but cannot take into proper consideration the availability of multiple images, the present teachings exploit real nuisance distribution by tracking frames during learning. This enables retaining object-specific variability, while removing nuisance variability. This is not possible in a single frame since there is no notion of object-specific variability; such variability is not represented in the training set; in order for it to be available, a tracking scheme that establishes correspondence between co-variant detector frames is beneficial. Of course, nuisance variability can be simulated in the present invention when given only one image, which operates as a special case of our descriptor. This invention represents novelty in each module of a visual recognition system, from the optional feature selection (selection is performed by maximizing structural stability margins), to tracking (performed by establishing correspondence of co-variant frames restricted to topologically consistent frames), to description (by aggregating local frames across time, or across multiple views of the same scene, available during learning), to a representation, aggregating multiple descriptors into a data structure designed for fast query. In addition, the entire end-to-end framework is novel in that the optimization at each level enables efficient implementation on a mobile device, and affords the flexibility of replacing the last component (classification algorithm) and the first one (co-variant detector) with different modules as computational capabilities of mobile devices improve.

The present invention addresses all components of a visual recognition system, including low-level feature detection and tracking, construction of the best feature descriptor, that we also refer to as a "template", and the construction of a representation from a collection of multiple such descriptors, and the design of the classification system using such descriptors. Tracking is a necessary component in designing and computing our feature descriptor. Tracking is typically not a component of existing visual recognition systems, since existing feature descriptors such as SIFT, SURF, GLOH, etc., are constructed from each individual image.

We have also found that the traditional notion of stability, that measures the sensitivity of a descriptor with respect to small perturbations of a nuisance, is irrelevant to recognition. Any properly designed co-variant detection is automatically stable in this sense.

From the description herein, it will be appreciated that present invention provides methods and apparatus for visual recognition on a hand-held resource limited device. Inventive teachings can be applied in a variety of apparatus and applications, including cell phones, cameras, and other devices which incorporate an image capture elements.

From the foregoing description, it further will be appreciated that the preferred embodiments of present invention includes various novel features which can be employed singly or in combination, including, but not limited to, the following:

1. Propagating Detection Across Scale. We select starting from coarse scales, and we identify a frame as having a correspondent in a finer scale if, within the region centered at the selected point and within the region determined by the coarser scale, there is one and only one response to the feature selection mechanism in the finer scale. If there is none, or more than one, then we halt propagation across scale, and we just record the region at the previous scale.

2. Feature Tracking. Matching is performed from coarse to fine scales, and is propagated to finer scales only if, within the region determined by the coarser scale, transformed according to the estimated motion at said coarse scale, there is one and only one feature at the finer scale. If there is none, or more than one, that feature track is terminated (not propagated to finer scale).

3. Feature Descriptors. Our tracking mechanism provides a collection of "temporally linked" reference frames. Think of these as image regions centered at a point, with size proportional to the scale, and moving within the image. If you place yourself at this point, and move with it, you would see no change around you if the region corresponded to a planar patch in the scene that was just translating (if you use a translational frame; or translating, rotating and scaling if you use a similarity frame, etc.). However, if the object has a certain shape, and/or if the motion is not just translation (or if the object is deforming), you would see the image around your moving frame changing in a way that depends on the specific object. Now think of each frame at each time as a sample from a distribution. Our descriptor is a function of this distribution. The simplest is just the mean: Take the stack of these image regions, and compute the average at each pixel. An alternative is the median, or the histogram, for example. A more sophisticated one is a descriptor that does not average (or median, or histogram) pixel values, but instead a contrast-invariant function of pixel values, such as the gradient direction.

4. Temporal Aggregation. Employing temporal aggregation in computing the descriptor is a unique and distinguishing characteristic of our inventive methods.

5. Representation. Once a feature descriptor is available, one can aggregate a plurality of them in a spatial representation. In our invention, we are not restricted to a Bag of features, and can instead use any other means of performing spatial aggregation.

6. Recognition. Once a representation is given, the problem of recognition becomes standard machine learning. In our invention, any classifier can be used.

7. Augmented Reality. Our invention facilitates "augmented reality", which is visualizing content overlaid live video, where the content moves according to the video. Our detection and tracking methods enable "attaching" content to the image and make it move so as it appears to be attached to the scene.

It will be further appreciated that the invention can be embodied in various ways, which include but are not limited to the following:

1. A visual recognition apparatus for identifying objects captured in a video stream having a captured time period, the apparatus comprising: an image sensor configured for capturing a video stream; a computer processor; and programming for processing said video stream to perform visual recognition by performing steps comprising: capturing the video stream from said image sensor; associating each frame in an image with a corresponding frame in temporally adjacent images, or in images taken from nearby vantage points; and temporally aggregating statistics computed at one or more collections of temporally corresponding frames, into a descriptor.

2. The apparatus of embodiment 1, wherein said temporal aggregating of statistics is performed by computing a mean, or median, or mode, or sample histogram of a contrast-invariant function of the image in said frames.

3. The apparatus of embodiment 1, wherein said programming performs steps comprising: spatially aggregating such statistics into a representation that is insensitive to nuisance factor and distinctive; exploiting such a representation within a classification scheme to enable the detection, localization, recognition and categorization of objects and scenes in video; and displaying the result of the classification scheme by overlaying information on the live video stream, optionally localized and overlaid on the object of interest.

4. The apparatus of embodiment 1, wherein said programming performs steps comprising: selecting a plurality of features corresponding to translational, similarity, affine or more general reference frames from the video stream for objects in a field of view of the video stream; and performing such a selection at a plurality of scales, and using topological consistency across scale as a criterion for propagating said general reference frames across different scales.

5. The apparatus of embodiment 4, wherein said plurality of features comprises a plurality of feature points.

6. The apparatus of embodiment 4, wherein said programming ranks features according to their structural stability margin.

7. The apparatus of embodiment 6, wherein said structural stability margin comprises a maximum norm of the nuisance that does not cause a singularity in the detection mechanism.

8. The apparatus of embodiment 1, wherein said programming includes a canonization mechanism which does not rely on a co-variant detector.

9. The apparatus of embodiment 1, wherein said programming canonizes rotation in response to a gravity sensor signal.

10. The apparatus of embodiment 4, wherein said programming performs steps comprising: computing a co-variant region that is proximate to a feature point of said feature; computing a contrast invariant feature; and performing a temporal aggregation operation of a number of statistics computed on each image associated with the plurality of video frames over a time period.

11. The apparatus of embodiment 10, wherein the temporal aggregation operation comprises aggregating the contrast invariant feature at each video frame during the time period at the corresponding scale of a feature point of the feature.

12. A visual recognition method for identifying objects captured in a video stream having a captured time period, the method comprising: capturing the video stream on an electronic device; enabling the user to select a target object or scene for training; capturing the video stream from said image sensor; associating each frame in an image with a corresponding frame in temporally adjacent images, or in images taken from nearby vantage points; and temporally aggregating statistics computed at one or more collections of temporally corresponding frames, into a descriptor.

13. The method of embodiment 12, wherein said aggregation is performed by computing a mean, or median, or mode, or sample histogram of a contrast-invariant function of the image in said frames.

14. The method of embodiment 12, further comprising: spatially aggregating such statistics into a representation that is insensitive to nuisance factor and distinctive; exploiting such a representation within a classification scheme to enable the detection, localization, recognition and categorization of objects and scenes in video; and displaying the result of the classification scheme by overlaying information on the live video stream, optionally localized and overlaid on the object of interest.

15. The method of embodiment 12, further comprising: selecting a plurality of features corresponding to translational, similarity, affine or more general reference frames from the video stream for objects in a field of view of the video stream; and performing such a selection at a plurality of scales, and using topological consistency across scale as a criterion for propagating said general reference frames across different scales.

16. A visual recognition apparatus for identifying objects captured in a video stream having a captured time period, the apparatus comprising: an image sensor configured for capturing a video stream; a computer processor; and programming for processing said video stream to perform visual recognition by performing steps comprising: capturing the video stream from said image sensor; associating each frame in an image with a corresponding frame in temporally adjacent images, or in images taken from nearby vantage points; temporally aggregating statistics computed at one or more collections of temporally corresponding frames, into a descriptor; spatially aggregating such statistics into a representation that is insensitive to nuisance factor and distinctive; exploiting such a representation within a classification scheme to enable the detection, localization, recognition and categorization of objects and scenes in video; and displaying the result of the classification scheme by overlaying information on the live video stream, optionally localized and overlaid on the object of interest.

17. A visual recognition apparatus for identifying objects captured in a video stream having a captured time period, the apparatus comprising: an image sensor configured for capturing a video stream; a computer processor; and programming for processing said video stream to perform visual recognition by performing steps comprising: capturing the video stream from said image sensor; optionally selecting a plurality of features corresponding to translational, similarity, affine or more general reference frames from the video stream for objects in a field of view of the video stream; performing such a selection at a plurality of scales, and using topological consistency across scale as a criterion for propagating said general reference frames across different scales; associating each frame in an image with a corresponding frame in temporally adjacent images, or in images taken from nearby vantage points; temporally aggregating statistics computed at one or more collections of temporally corresponding frames, into a descriptor; spatially aggregating such statistics into a representation that is insensitive to nuisance factor and distinctive; exploiting such a representation within a classification scheme to enable the detection, localization, recognition and categorization of objects and scenes in video; and displaying the result of the classification scheme by overlaying information on the live video stream, optionally localized and overlaid on the object of interest.

18. The apparatus of embodiment 16, wherein said programming performs steps comprising: selecting a plurality of features corresponding to translational, similarity, affine or more general reference frames from the video stream for objects in a field of view of the video stream; and performing such a selection at a plurality of scales, and using topological consistency across scale as a criterion for propagating said general reference frames across different scales.

19. The apparatus of embodiment 16 or 17, wherein said temporal aggregating of statistics is performed by computing a mean, or median, or mode, or sample histogram of a contrast-invariant function of the image in said frames.

20. The apparatus of embodiment 17 or 18, wherein said plurality of features comprises a plurality of feature points.

21. The apparatus of embodiment 17 or 18, wherein said programming ranks features according to their structural stability margin.

22. The apparatus of embodiment 21, wherein said structural stability margin comprises a maximum norm of the nuisance that does not cause a singularity in the detection mechanism.

23. The apparatus of embodiment 16 or 17, wherein said programming includes a canonization mechanism which does not rely on a co-variant detector.

24. The apparatus of embodiment 16 or 17, wherein said programming canonizes rotation in response to a gravity sensor signal.

25. The apparatus of embodiment 16 or 17, wherein said programming performs steps comprising: computing a co-variant region that is proximate to a feature point of said feature; computing a contrast invariant feature; and performing a temporal aggregation operation of a number of statistics computed on each image associated with the plurality of video frames over a time period.

26. The apparatus of embodiment 25, wherein the temporal aggregation operation comprises aggregating the contrast invariant feature at each video frame during the time period at the corresponding scale of a feature point of the feature.

27. A visual recognition method for identifying objects captured in a video stream having a captured time period, the method comprising: capturing the video stream on an electronic device; enabling the user to select a target object or scene for training; capturing the video stream from said image sensor; associating each frame in an image with a corresponding frame in temporally adjacent images, or in images taken from nearby vantage points; temporally aggregating statistics computed at one or more collections of temporally corresponding frames, into a descriptor; spatially aggregating such statistics into a representation that is insensitive to nuisance factor and distinctive; exploiting such a representation within a classification scheme to enable the detection, localization, recognition and categorization of objects and scenes in video; and displaying the result of the classification scheme by overlaying information on the live video stream, optionally localized and overlaid on the object of interest.

28. A visual recognition method for identifying objects captured in a video stream having a captured time period, the method comprising: capturing the video stream on an electronic device; enabling the user to select a target object or scene for training; capturing the video stream from said image sensor; optionally selecting a plurality of features corresponding to translational, similarity, affine or more general reference frames from the video stream for objects in a field of view of the video stream; performing such a selection at a plurality of scales, and using topological consistency across scale as a criterion for propagating said general reference frames across different scales; associating each frame in an image with a corresponding frame in temporally adjacent images, or in images taken from nearby vantage points; temporally aggregating statistics computed at one or more collections of temporally corresponding frames, into a descriptor; spatially aggregating such statistics into a representation that is insensitive to nuisance factor and distinctive; exploiting such a representation within a classification scheme to enable the detection, localization, recognition and categorization of objects and scenes in video; and displaying the result of the classification scheme by overlaying information on the live video stream, optionally localized and overlaid on the object of interest.

29. The method of embodiment 27, wherein said programming performs steps comprising: selecting a plurality of features corresponding to translational, similarity, affine or more general reference frames from the video stream for objects in a field of view of the video stream; and performing such a selection at a plurality of scales, and using topological consistency across scale as a criterion for propagating said general reference frames across different scales.

30. The method of embodiment 27 or 28, wherein said temporal aggregating of statistics is performed by computing a mean, or median, or mode, or sample histogram of a contrast-invariant function of the image in said frames.

31. The method of embodiment 28 or 29, wherein said plurality of features comprises a plurality of feature points.

32. The method of embodiment 28 or 29, further comprising ranking features according to their structural stability margin.

33. The method of embodiment 32, wherein said structural stability margin comprises a maximum norm of the nuisance that does not cause a singularity in the detection mechanism.

34. The method of embodiment 27 or 28, further comprising employing a canonization mechanism which does not rely on a co-variant detector.

35. The method of embodiment 27 or 28, further comprising canonizing rotation in response to a gravity sensor signal.

36. The method of embodiment 27 or 28, further comprising: computing a co-variant region that is proximate to a feature point of said feature; computing a contrast invariant feature; and performing a temporal aggregation operation of a number of statistics computed on each image associated with the plurality of video frames over a time period.

37. The method of embodiment 36, wherein the temporal aggregation operation comprises aggregating the contrast invariant feature at each video frame during the time period at the corresponding scale of a feature point of the feature.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Pseudo-Code For Tracking on the Selection Tree

CONSTRUCT image pyramid
LOOP scale FROM max_scale TO min_scale
  SELECT features AT current scale
  FOR EACH feature AT current scale
    IF EXIST parent AT some scale FROM scale+1 TO max_scale
      PROPAGATE parent's motion TO feature
    ENDIF
    TRACK feature AT current scale
    VERIFY feature track quality
  ENDFOR
ENDLOOP

TABLE 2

Comparison of TST and MLK on Short and Long Baselines

| | tracking error (pixels) | | | computation | inlier ratio |
| --- | --- | --- | --- | --- | --- |
| | median | mean | std. | time (ms) | (%) |
| Harris-MLK short | 0.35 | 0.72 | 2.49 | 91.62 | 83.18 |
| FAST-MLK short | 0.36 | 0.97 | 5.94 | 121.95 | 80.69 |
| Harris-TST short | 0.35 | 0.61 | 1.15 | 17.58 | 84.31 |
| FAST-TST short | 0.34 | 0.56 | 0.72 | 20.60 | 85.74 |
| Harris-MLK long | 0.83 | 2.19 | 9.30 | 114.00 | 59.26 |
| FAST-MLK long | 0.88 | 3.10 | 14.66 | 143.39 | 55.85 |
| Harris-TST long | 0.84 | 1.91 | 5.37 | 23.63 | 58.17 |
| FAST-TST long | 0.81 | 1.67 | 4.00 | 22.79 | 59.28 |

TABLE 3

Comparison of Runtime Computations on an iPhone

| | tracking | descriptors | overall |
| --- | --- | --- | --- |
| TST-BTD | 40 mS | 15 mS | 7 fps |
| MLK-SIFT | 100 mS | 180 mS | 3 fps |

What is claimed is:

1. A visual recognition apparatus for identifying objects captured in a video stream having a captured time period, the apparatus comprising:
   a hardware processor; and
   programming in a non-transitory computer readable medium and executable on the hardware processor for:
   capturing a video stream on an electronic device having an image sensor, said video stream comprising a plurality of temporally adjacent images;
   enabling a user of the electronic device to select, from said video stream, a target object or scene for training;
   associating each frame in an image with a corresponding frame in temporally adjacent images, or in images taken from nearby vantage points; and
   temporally aggregating statistics computed at one or more collections of temporally corresponding frames, into a descriptor;
   wherein said programming ranks image features according to their structural stability margin; and
   wherein said structural stability margin comprises a maximum norm of the nuisance that does not cause a singularity in the detection mechanism.

2. The apparatus recited in claim 1, wherein said temporal aggregating of statistics is performed by computing a mean, or median, or mode, or sample histogram of a contrast-invariant function of the image in said frames.

3. The apparatus recited in claim 1, wherein said programming performs steps comprising:
   spatially aggregating such statistics into a representation that is insensitive to nuisance factor and distinctive;
   exploiting such a representation within a classification scheme to enable the detection, localization, recognition and categorization of objects and scenes in video; and
   displaying the result of the classification scheme by overlaying information on the live video stream, optionally localized and overlaid on the object of interest.

4. The apparatus recited in claim 1, wherein said programming performs steps comprising:
   selecting a plurality of features corresponding to translational, similarity, affine or more general reference frames from the video stream for objects in a field of view of the video stream; and performing such a selection at a plurality of scales, and using topological consistency across scale as a criterion for propagating said general reference frames across different scales.

5. The apparatus recited in claim 4, wherein said plurality of features comprises a plurality of feature points.

6. The apparatus recited in claim 1, wherein said programming includes a canonization mechanism which does not rely on a co-variant detector.

7. The apparatus recited in claim 1, wherein said programming canonizes rotation in response to a gravity sensor signal.

8. The apparatus recited in claim 4, wherein said programming performs steps comprising:
computing a co-variant region that is proximate to a feature point of said feature;
computing a contrast invariant feature; and
performing a temporal aggregation operation of a number of statistics computed on each image associated with the plurality of video frames over a time period.

9. The apparatus recited in claim 8, wherein the temporal aggregation operation comprises aggregating the contrast invariant feature at each video frame during the time period at the corresponding scale of a feature point of the feature.

10. A visual recognition method for identifying objects captured in a video stream having a captured time period, the method comprising:
capturing a video stream on an electronic device having an image sensor, said video stream comprising a plurality of temporally adjacent image;
enabling a user of the electronic device to select, from said video stream, a target object or scene for training;
associating each frame in an image with a corresponding frame in temporally adjacent images, or in images taken from nearby vantage points;
temporally aggregating statistics computed at one or more collections of temporally corresponding frames, into a descriptor; and
ranking image features an according to their structural stability margin;
wherein said structural stability margin comprises a maximum norm of the nuisance that does not cause a singularity in the detection mechanism; and
wherein said method is performed by executing programming on at least one hardware processor, said programming residing on a non-transitory medium readable by the hardware processor.

11. The method recited in claim 10, wherein said aggregation is performed by computing a mean, or median, or mode, or sample histogram of a contrast-invariant function of the image in said frames.

12. The method recited in claim 10, further comprising:
spatially aggregating such statistics into a representation that is insensitive to nuisance factor and distinctive;
exploiting such a representation within a classification scheme to enable the detection, localization, recognition and categorization of objects and scenes in video; and
displaying the result of the classification scheme by overlaying information on the live video stream, optionally localized and overlaid on the object of interest.

13. The method recited in claim 10, further comprising:
selecting a plurality of features corresponding to translational, similarity, affine or more general reference frames from the video stream for objects in a field of view of the video stream; and
performing such a selection at a plurality of scales, and using topological consistency across scale as a criterion for propagating said general reference frames across different scales.

* * * * *